United States Patent [19]

Okamoto et al.

[11] Patent Number: 5,224,162
[45] Date of Patent: Jun. 29, 1993

[54] ELECTRONIC CASH SYSTEM

[75] Inventors: Tatsuaki Okamoto, Yokosuka; Kazuo Ohta, Zushi, both of Japan

[73] Assignee: Nippon Telegraph and Telephone Corporation, Tokyo, Japan

[21] Appl. No.: 895,036

[22] Filed: Jun. 8, 1992

[30] Foreign Application Priority Data

Jun. 14, 1991 [JP] Japan .................................. 6-143530
Jul. 10, 1991 [JP] Japan .................................. 3-170131

[51] Int. Cl.$^5$ ............................................ H04K 1/00
[52] U.S. Cl. ........................................ 380/24; 380/30; 380/49; 235/379
[58] Field of Search ................... 380/23, 24, 25, 30, 380/49; 235/379, 381; 340/825.31, 825.34; 902/2, 7, 22, 26, 27, 28

[56] References Cited

U.S. PATENT DOCUMENTS

| | | | |
|---|---|---|---|
| 4,630,201 | 12/1986 | White ......................... | 340/825.34 X |
| 4,633,036 | 12/1986 | Hellman et al. .................. | 380/30 X |
| 4,949,380 | 8/1990 | Chaum .................... | 380/30 |
| 4,969,189 | 11/1990 | Ohta et al. ............... | 380/25 |
| 4,977,595 | 12/1990 | Ohta et al. ............... | 380/24 |
| 5,010,485 | 4/1991 | Bigari ............................. | 235/379 X |
| 5,140,634 | 8/1992 | Guillou et al. .................. | 380/23 |

*Primary Examiner*—Tod R. Swann
*Attorney, Agent, or Firm*—Pollock, VandeSande and Priddy

[57] ABSTRACT

In an electronic cash system, K sets of blind signature information are derived from secret information containing identification information of a user, K/2 sets of them are opened and a bank attaches a blind signature to the remaining K/2 sets of information. The user obtains a signed license from the blind signature. The user generates blind signature information from the license and a desired amount of money and gets a blind signature of the bank to the blind signature information and obtains electronic cash signed by the bank from the blind signature. The user presents to a shop a residue power root of a node in a money hierarchial structure and the electronic cash, corresponding to the amount of money to be used, and the shop verifies their validity and, if they are valid, offers inquiry information to the user. The user offers, as response information, a residue power root of the node corresponding to the amount of money to be used to the shop. The shop verifies the validity of the response information and, if it is valid, acknowledges the payment with electronic cash of the amount of money to be used.

11 Claims, 11 Drawing Sheets

ELECTRONIC CASH SYSTEM

BACKGROUND OF THE INVENTION

The present invention relates to an electronic cash system which implements the use of electronic cash through utilization of a telecommunication system or smart card by a bank who issues the electronic cash, a customer or user who uses the electronic cash and a shop who receives the electronic cash from the user and settles an account with the bank.

An electronic funds transfer through a telecommunication system is now coming into common use. In general, a certificate which is refundable (such as a draft or check) has a symbolic function of its own (which guarantees its possessor to the rights stated thereon). When handled in the telecommunication system, the certificate is in the form of digitized data, which can readily be copied for conversion into money a plurality of times. This problem is encountered as well in the implementation of electronic cash such as a prepaid card because it can also be copied many times for abuse such as refund or purchase in the possessor's name.

Another method for the implementation of such an electronic cash system is to settle accounts later through use of an electronic ID card (such as an electronic credit card or electronic check). This method differs in the manner or form of use (settlement of accounts) from the real cash system but can be regarded as one kind of application or embodiment of electronic cash. With the electronic credit card, the use of a digital signature as a substitute for a handwritten signature allows electronic processing of all pieces of data involved and hence permits the transfer of information for settlement of accounts through telecommunication circuits. However, the most crucial problem of this system is that the privacy of the user is not ever guaranteed—the same is true of the current credit cards and checks. That is, an organization which issues credit cards and settles accounts is capable of acquiring users' purchase records.

On the other hand, it has been proposed by D. Chaum ("Security without Identification: Transaction Systems to Make Big Brothers Obsolute," Comm. of ACM. 28, 10, pp. 1030-1044, 1985) that the above-noted problems inherent with the prior art system could be solved by a combination of a blind digital signature scheme and an on-line check for each transaction at a shop (that is, the shop inquires on-line of a management center about the double usage or abuse of the user's blind digital signature). From the viewpoints of the processing time (or user's waiting time), the communication cost, the on-line processing cost and database maintenance and management cost at the management center and so forth, the above-said inquiry from the shop to the management center for each transaction is feasible on a small scale but cannot be said to be practical. It is therefore preferable that the procedure between the user and the shop at the time of payment of electronic cash be executed off-line just like a sales-person verifies the validity of ordinary or real cash by the senses of sight and touch and performs local (off-line) processing accordingly.

Taking the foregoing into account, the criteria describing the ideal electronic cash system are as follows:

(a) Independence: The security of electronic cash cannot depend on any condition. Then, the cash can be transferred through networks.

(b) Security: The ability to copy (reuse) and forge the cash must be prevented.

(c) Privacy (Untraceability): The privacy of the user should be protected. That is, the relationship between the user and his purchases must be untraceable by anyone.

(d) Off-line payment: When a user pays electronic cash to a shop, the procedure between the user and the shop should be executed in an off-line manner. That is, the shop does not need to be linked to the host in the user's payment procedure.

(e) Transferrability: The cash can be transferred to other users.

(f) Dividability: One issued piece of cash worth value C (dollars) can be subdivided into many pieces such that each subdivided piece is worth any desired value less than C and the total value of all pieces is equivalent to C.

The last two criteria (e) and (f) are naturally called for from the viewpoint of the handiness of electronic cash. The dividability (f) is a relatively severe criterion that even the real cash system cannot satisfy. That is, it is impossible to subdivide a hundred-dollar bill into 10 pieces each worth $10. This is the reason why we must hold many bills and coins in our wallets. On the other hand, the current prepaid card systems feature this function and trade on the handiness based thereon but do not satisfy the criteria (a), (b) and (c).

Recently there have been proposed some electronic cash systems which satisfy criteria (a), (b), (c) and (d). Of them, a system by Chaum et al. (D. Chaum, A. Fiat and M. Noar, "Untraceable Electronic Cash," the Proc. of Crypto '88, pp. 319-327, 1988) satisfies these four criteria but fails to satisfy criteria (e) and (f). Moreover, this system involves communication and processing of an appreciably large amount of information between the bank and the user upon each issuance of electronic cash. A system by Okamoto and Ohta (U.S. Pat. No. 4,977,595) satisfies criterion (e) in addition to the four criteria (a) through (d) and satisfies criterion (f) to some extent.

In the foregoing Okamoto and Ohta system the user obtains a blind signature of the bank to user information $V_i$ generated from secret information $S_i$ containing the user's identification (ID) in a raw form and holds the signed user information as a license $B_i$. When the user wants the bank to issue electronic cash, he obtains the blinds signature of the bank to a set of $k/2$ pieces of authentication information $X_i$ produced from $k/2$ pieces of random information $R_i$ and the license $B_i$, and uses the thus signed information as electronic cash C. When the user pays with the electronic cash at a shop, he shows the $k/2$ pieces of authentication information $X_i$, $k/2$ pieces of user information $V_i$, the license $B_i$, etc. to the shop together with the electronic cash C and executes an authentication with interactive proof property by which the user makes a response $Y_i$ to an inquiry $E_i$ from the shop. The security of this method is based on the difficulty in the calculation of the higher degree roots. In the event that the user has committed invalid double usage of the electronic cash (that is, when the user has used twice the user information $V_i$ and the authentication information $X_i$ of the same group), two sets of different inquiries $E_i$ and responses $V_i$ with respect to the user information $V_i$ and the authentication information $X_i$ of the same group are reported to the bank; so that the secret information $S_i$ of the user can be obtained from the two sets of inquiries and responses, and hence the user's ID contained in the raw form in the information $S_i$ can be specified.

With the system proposed by Okamoto and Ohta, it is necessary that after issuance of the electronic cash C the k/2 pieces of authentication information $X_i$ corresponding to k/2 pieces of random information $R_i$ be stored on, for example, a smart card together with the license $B_i$. Assuming, for example, that the amounts of data necessary for one piece of authentication information $X_i$ and the license $B_i$ are each 64 bytes and k/2=20, then the above system requires as large a storage capacity as 64×21 bytes for only these pieces of information.

In the Okamoto-Ohta system, an electronic coupon ticket is also proposed, in which one piece of electronic cash can be subdivided into many pieces whose values are all equivalent. In this system, however, if the user pays for an article with cents, the store receives an enormous number of one-cent electronic coupon tickets from the user. For example, when the price of the article is $356.27, the store receives 35,627 electronic coupon tickets, where the data size of each ticket is several bytes. Thus the store receives about 200 megabytes of data for the transaction of just one article—this is utterly impractical.

SUMMARY OF THE INVENTION

It is therefore an object of the present invention to provide an electronic cash system which guarantees protection of the privacy of users and prevents abuse of electronic cash through any conspiracy and in which the data sizes of electronic cash and the associated information to be held by each user are small.

Another object of the present invention is to provide an electronic cash system which guarantees protection of the privacy of users and prevents abuse of electronic cash through any conspiracy and in which one issued piece of electronic cash of a certain face value can be subdivided a desired number of time into many pieces each worth a desired value until the total value of all subdivided pieces becomes equal to the value predetermined when the electronic cash was issued and in which the data size of each subdivided piece of electronic cash is small.

According to an aspect of the present invention, the electronic cash system in which the user has electronic cash and the license issued by a bank is entitled to use the electronic cash, inlcudes the following steps:

Step 1: The user furnishes the store with a composite number which is the product of at least two prime numbers, the electronic cash and information containing the licence;

Step 2: The store checks the validity of the license and the composite number and, if they are valid, prepares and offers an inquiry to the user;

Step 3: In reply to the inquiry, the user computes a power residue of a desired function using the composite number as a modulus and shows it as a response to the store; and Step 4: The store verifies the validity of the response through utilization of the composite number.

According to another aspect of the present invention, the electronic cash system in which the user uses the electronic cash issued by the bank, includes the following steps:

Step 1: The bank establishes a hierarchial structure table which is a tree having a required number of levels and in which one node corresponding to the face value of the electronic cash issued to the user is defined at the highest level, nodes of lower levels are sequentially branched from the node of the highest levels just like a tree and the unit value of each node is made to correspond to the total value of the immediately descendant nodes branched therefrom;

Step 2: The user selects a combination of nodes corresponding to the amount of money used from the hierarchial structure table in accordance with the following restrictions:

(a) Once a node is used, all of its ancestor and descendant nodes cannot be used;

(b) No node can be used more than once;

Step 3: The user creates an amount of money information corresponding to each node and offers it and electronic cash to the store.

In the first-mentioned aspect of the invention, the utilization of the power residue in the procedure between the user and the store is to use an even power root employing, as a modulus, a composite number called a Williams integer—this is based on the fact that the composite number used as the modulus can be factorized into prime factors by use of two different types of even power roots. That is, it is possible to utilize the principle that if the user abuses electronic cash, his identity (ID), which is his secret information, is revealed through the factorization of the modulus into prime factors. In the execution of this principle the amount of data to be held by the user is small, because the calculation of the residue power root, which is provided to the store, does not call for such k/2 random numbers $R_i$ as are needed in the aforementioned Okamoto-Ohta system.

In the second-mentioned aspect of the invention, a hierarchial structure table corresponding to the structure of electronic cash is constructed, and when the electronic cash is used, cash within a certain face value can be used in a manner corresponding to the structure of the table.

BREIF DESCRIPTION OF THE DRAWINGS

DESCRIPTION OF THE PREFERRED EMBODIMENTS

Figure 1:
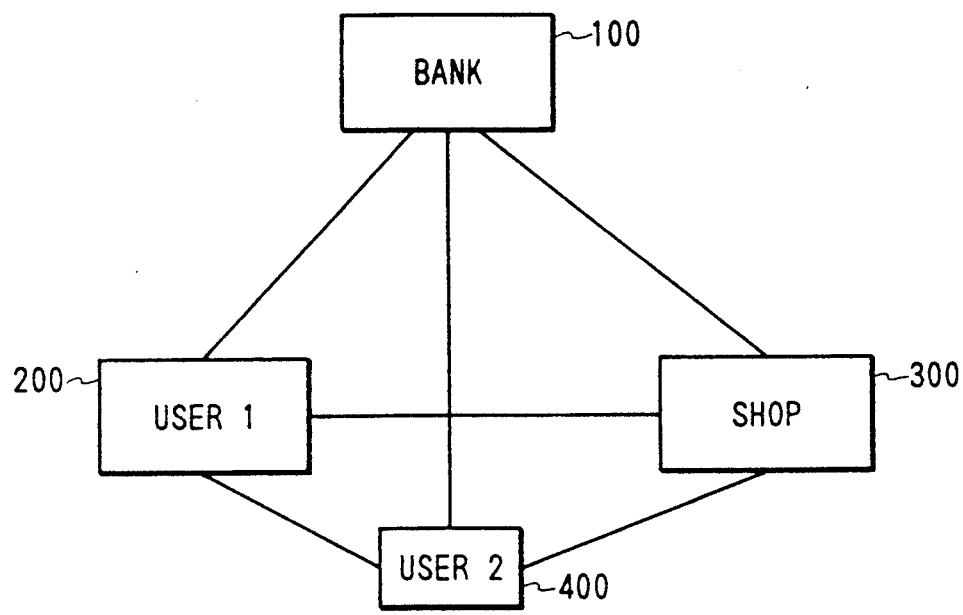
FIG. 1 is a block diagram illustrating an example of the system to which the present invention is applied.

FIG. 1 shows a system to which the present invention is applied and in which a bank 100, users 1 (200) and 2 (400) and a store 300 are interconnected via telecommunication networks, for example. The users 1 and 2 may also pay the store directly with smart cards, not via the telecommunication networks.

In the electronic cash system according to the present invention, the bank (i.e. an organization that issues electronic cash and settles accounts) 100 issues a license when the user opens an account with the bank 100. Then, the bank 100 issues electronic cash (referred to also as an electronic bill) of a certain face value to the user at his request. The user uses the electronic cash many times to pay at various stores until the face value of the electronic cash is reached. Finally, each store settles an account with the bank 100 for each payment of electronic cash by the user.

PRELIMINARY PROCEDURE

First of all, the bank 100 creates, as information corresponding to the license, a secret key dA and public keys eA and nA which are used for an RSA digital signature, and lays the keys eA and nA open to the public. Furthermore, the bank 100 creates information corresponding to the face value of the electronic cash, a secret key dA' and public keys eA' and nA' which are used for the RSA digital signature, and lays the keys eA' and nA' open to the public, together with the face value. On the other hand, the user creates a secret key dP and public keys eP and nP which are used for an RSA digital signature and lays the keys eP and nP open to the public, together with identification information $ID_p$ of his own. The RSA digital signature scheme is disclosed in, for example, U.S. Pat. No. 4,795,063 and is well-known in the art.

Incidentally, the RSA digital signature which the bank uses may be replaced by any other blind digital signatures (T. Okamoto and K. Ohta, "Divertible Zero-Knowledge Interactive Proofs and Commutative Random Self-Reducible," Proc. of Eurocrypt '89, 1989). The RSA digital signature for the user may also be replaced by any other digital signatures.

The bank further defines and keeps there random functions $f_\Gamma$, $f_\Lambda$ and $f_\Omega$ open to the public. These functions are used to determine the value of each node of hierarchial structure tables (a $\Gamma$ table and a $\Lambda$ table) described later on. These functions are, for example, universal hash functions or pseudo-random generating functions. In the following description, A=B mod C represents a calculation (called a residue calculation) for obtaining a residue A by dividing B by C, and A≡B (mod C) represents a residue calculation using C as the modulus with respect to both of A and B.

(1) Procedure for Issuing License

A description will be given first of the case where the user (hereinafter identified by 200), who has newly opened an account with the bank 100, has a license issued from the bank 100 by the cut-and-choose methodology. The user 200 creates K sets of randomized blind signature information $W_i$ from secret information $S_i$ containing the identification information $ID_p$ of his own (such as his account number), or more specifically, user information $I_i$ derived from the secret information $S_i$. The bank 100 makes the user 200 open L (which is smaller than K) sets of information in the K sets of blind information. If the opened information is correct, then the bank 100 produces a blind signature W with respect to the remaining unopened (K-L) sets of information and transmits it to the user 200. The user 200 calculates a signature B of the bank 100 for the user information $I_i$, from the blind signature W received from the bank 100 and uses the thus calculated bank signature as a license B.

Figure 2:
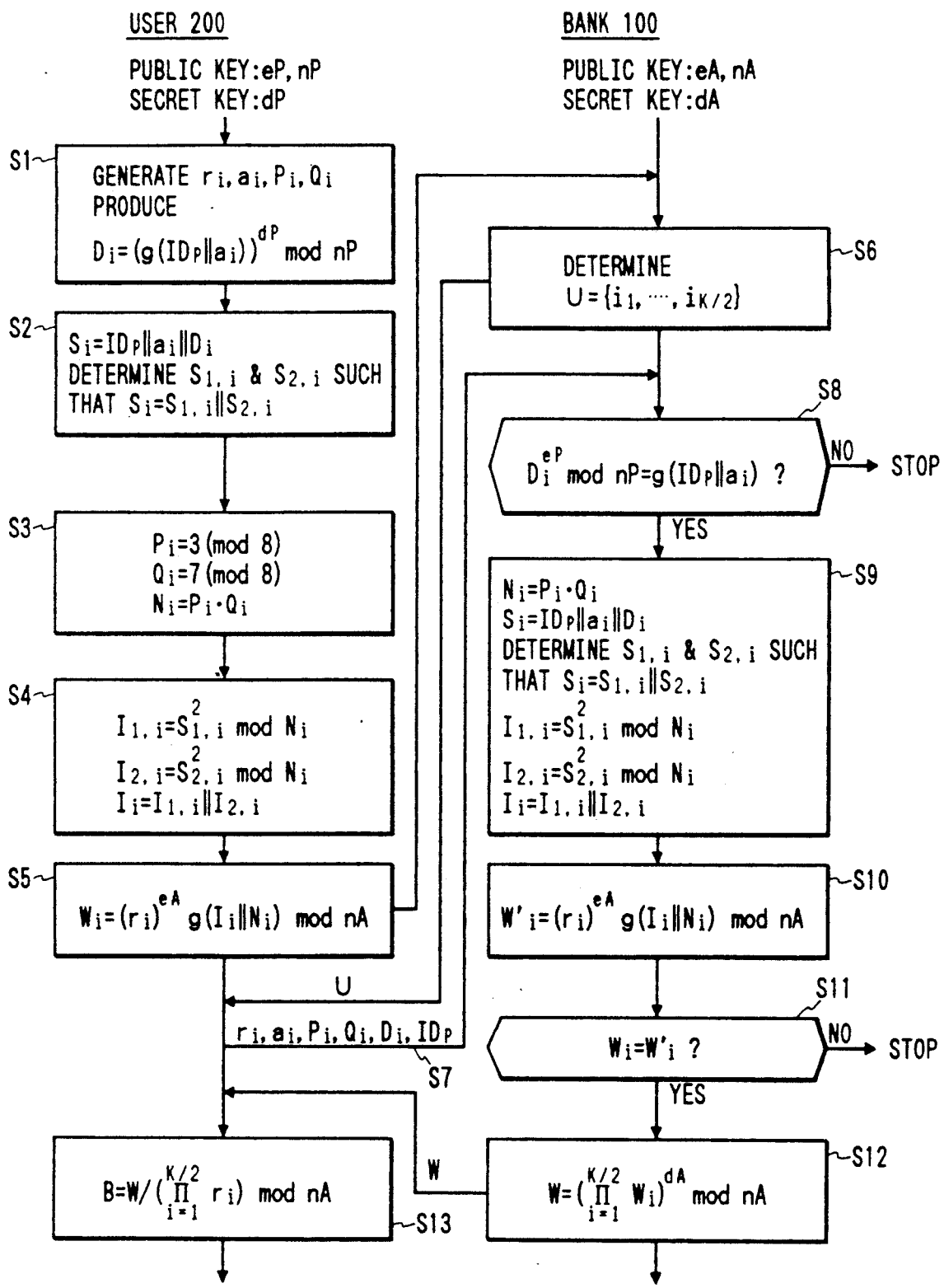
FIG. 2 is a flowchart showing, by way of example, the procedure for issuing a license.
Figure 3:
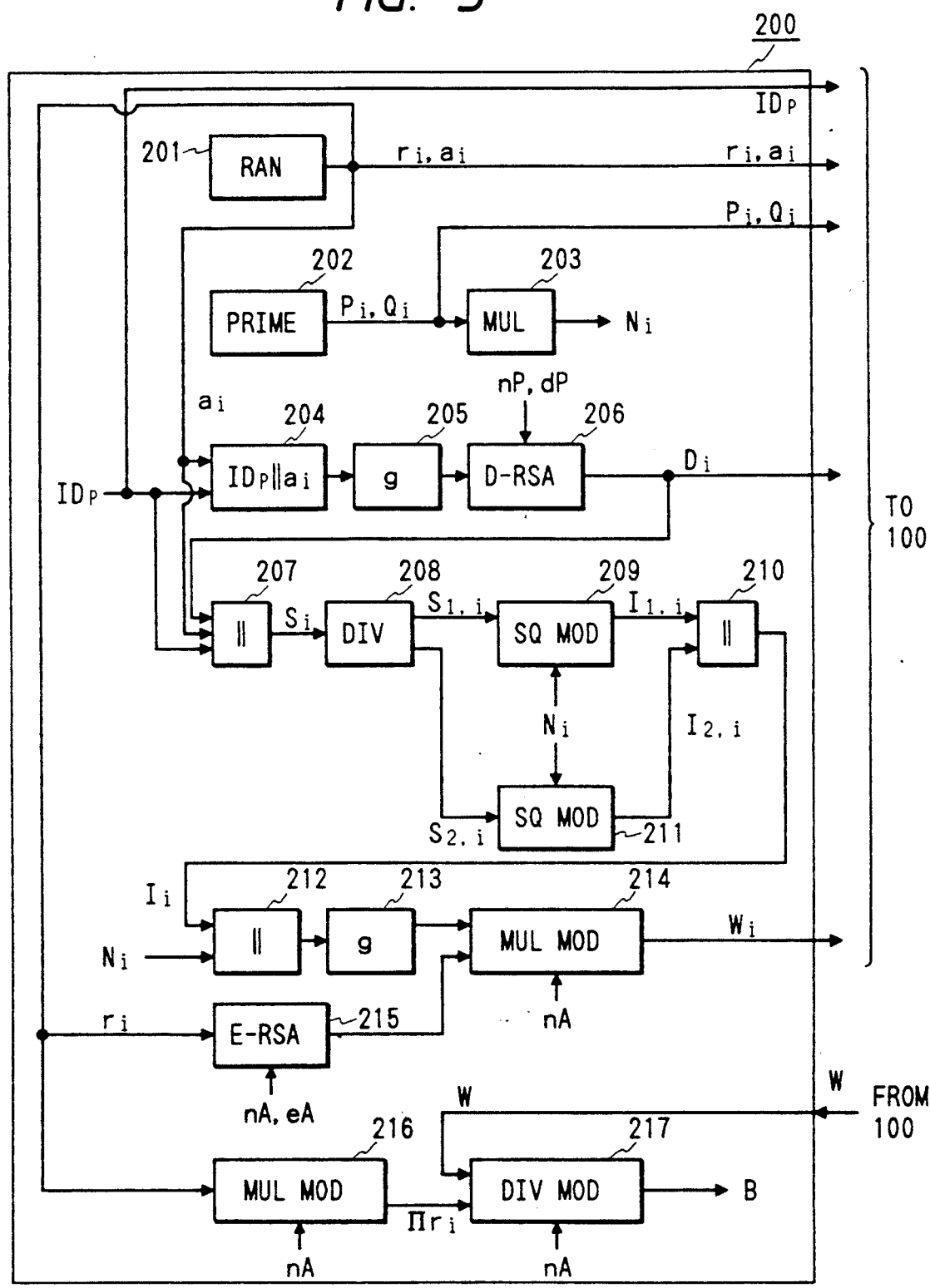
FIG. 3 is a block diagram showing the construction for the license issuance proceeding on the part of the user.
Figure 4:
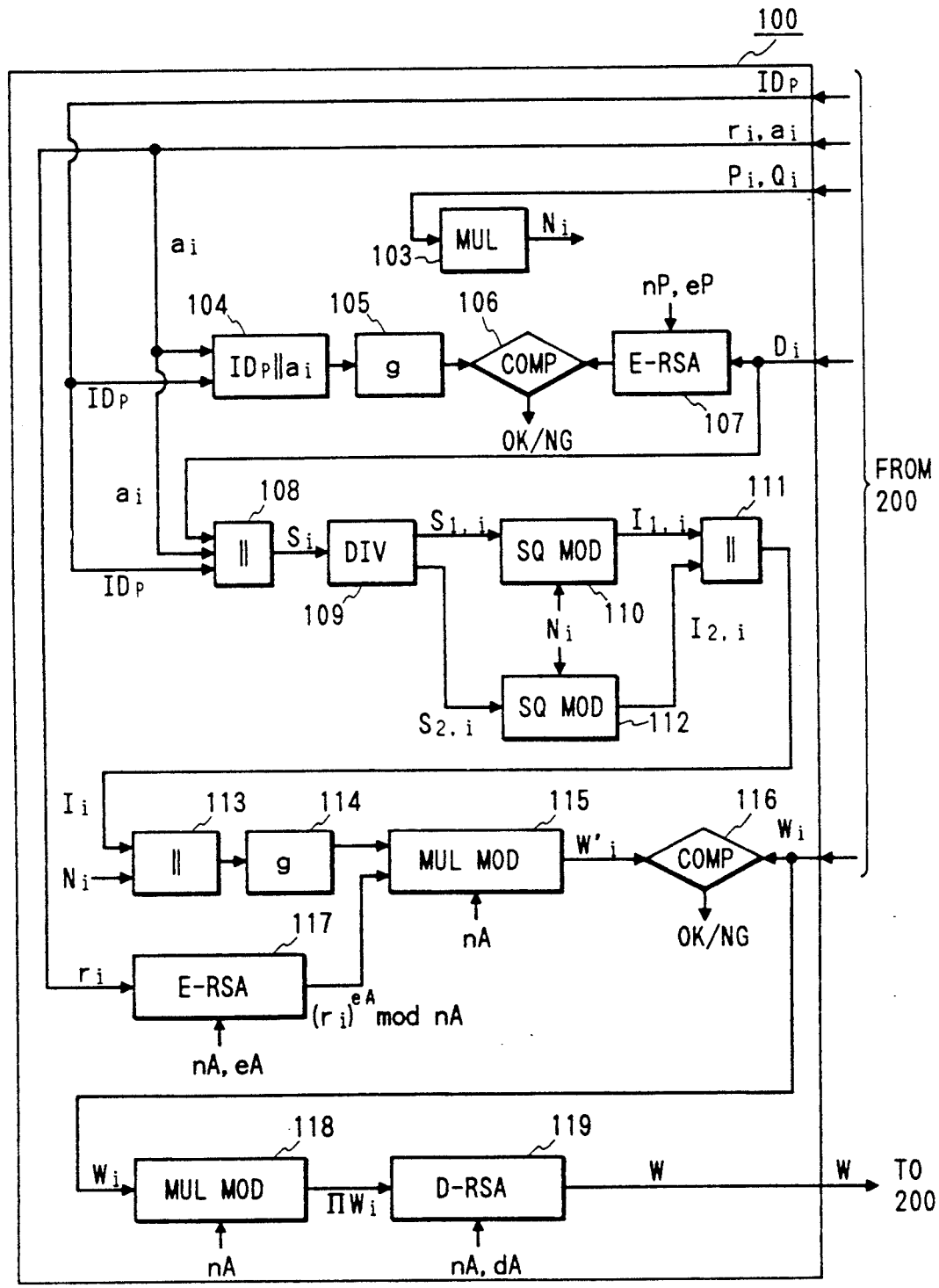
FIG. 4 is a block diagram showing the construction for the license issuance processing on the part of the bank.

The procedure for the user 200 to have the bank 100 issue the license is such as described below. FIG. 2 shows an example of communication between the bank 100 and the user 200. FIGS. 3 and 4 show arrangements for license issuance processing on the part of the user 200 and on the part of the bank 100, respectively. The following description is given on the assumption that i=1, 2, . . . , K.

Step S1: The user 200 generates random numbers $a_i$ and $r_i$ by means of a random generator 201. The random number $a_i$ is input into a concatenator 204, together with the identification information $ID_p$, and the concatenated output $(ID_p \| a_i)$ is applied to a one-way hash function calculator 205. The output $g(ID_p \| a_i)$ of the hash function calculator 205 is provided to RSA signing equipment 206 together with the user's secret key dP and opened key nP for signature to obtain $$D_i = (g(ID_p \| a_i))^{dP} \bmod nP \qquad (1)$$

Step S2: The output of the signing equipment 206 is provided to a concatenator 207 together with the information $ID_p$ and the random number $a_i$, wherein secret information $S_i = ID_p \| a_i \| D_i$ is obtained. Furthermore, the secret information $S_i$ thus obtained is input into a divider 208, wherein it is divided into $S_{1,i}$ and $S_{2,i}$ such that $S_i = S_{1,i} \| S_{2,i}$.

Step S3: A prime generator 202 is used to generate two primes $P_i$ and $Q_i$ which satisfy $P_i \equiv 3 \pmod 8$ and $Q_i \equiv 7 \pmod 8$, and their product, $N_i = P_i Q_i$, is obtained by a multiplier 203, where the composite number $N_i$ is the Williams integer.

Step S4: The divider outputs $S_{1,i}$ and $S_{2,i}$ and the composite number $N_i$ are provided to modulo residue power calculators 209 and 211, from which the following outputs are obtained:

$$I_{1,i} = (S_{1,i})^2 \bmod N_i$$

$$I_{2,i} = (S_{2,i})^2 \bmod N_i \qquad (2)$$

These outputs are applied to a concatenator 210, wherein user information $I_i = I_{1,i} \| I_{2,i}$ is calculated.

Step S5: The composite number $N_i$ and the information $I_i$ are provided to a concatenator 212 and its output, $I_i \| N_i$, is applied to a one-way hash function calculator 213, from which $g(I_i \| N_i)$ is obtained. On the other hand, the random number $r_i$ is input into an RSA encoder 215 together with the public key (eA, nA) of the bank 100 to obtain therefrom $(r_i)^{eA}$ mod nA. Next, the outputs of the one-way hash function calculator 213 and the RSA encoder 215 are applied to a modulo power calculator 214 to obtain blind signature information $W_i$ $$W_i = (r_i)^{eA} g (I_i \| N_i) \bmod nA \tag{3}$$

The blind signature information $W_i$ (where $i = 1, 2, \ldots, K$) is transmitted to the bank 100.

Step S6: Next, in order to make the user 200 open his identification information $ID_p$ and a desired one of the K sets of information $a_i$, $P_i$, $Q_i$, $D_i$ and $r_i$ to make sure that the user 200 has correctly executed steps S1 through S5, the bank 100 randomly selects L (L<K) values of i, for example, K/2 values of i, from $i = 1, \ldots, K$ and transmits then as a disclosure request, $U = \{i_1, \ldots, i_{K/2}\}$, to the user 200. For the sake of brevity, let it be assumed that $i_1 = K/2 + 1$, $i_2 = K/2 + 2, \ldots, i_{k/2} = K$ are specified to be opened. It is not always necessary that $L = K/2$, but this value improves the efficiency of processing.

Step S7: Upon receipt of the disclosure request U from the bank 100, the user 200 opens his identification information $ID_p$ and the pieces of information $a_i$, $P_i$, $Q_i$, $D_i$ and $r_i$ of the bank's specified K/2 sets. When the i is the object to be opened, the bank 100 performs the following procedures.

Step S8: The bank 100 verifies the validity of the received signature $D_i$ by use of the pieces of information $a_i$ and $ID_p$ received from the user 200 and his public keys eP and nP. That is, the pieces of information $a_i$ and $D_i$ are concatenated by a concatenator 104, the output of which is applied to a one-way hash function calculator 105 to obtain $g(ID_p \| a_i)$. On the other hand, the identification information $ID_p$ and the public keys nP and eP received from the user are encoded by an RSA encoder 107, and the encoded output and the output of the calculator 105 are compared by a comparator 106. If they do not match, no further processing will be done.

Step S9: The pieces of information $a_i$, $P_i$, $Q_i$ and $ID_p$ received from the user 200 are provided to a multiplier 103 to obtain $N_i = P_i \cdot Q_i$. Further, the pieces of information $a_i$, $ID_p$ and $D_i$ are concatenated by a concatenator 108 to obtain the secret information $S_i$, which is divided by a divider 109. The divided output is provided to modulo power calculators 110 and 112, wherein it is subjected to a modulo power calculation using the composite number $N_i$, and their outputs are concatenated by a concatenator 111 to obtain the user information $I_i$.

Step S10: The information $I_i$ and the composite number $N_i$ thus obtained are concatenated by a concatenator 113, the output of which is applied to a one-way hash function calculator 114. The received random number $r_i$ and the public keys eA and nA are supplied to an RSA encoder 117 to the obtain $(r_i)^{eA}$ mod nA. The outputs of the encoder 117 and the calculator 114 are provided to a modulo power calculator 115, wherein the following equation is calculated:

$$W'_i = (r_i)^{eA} g (I_i \| N_i) \bmod nA \tag{3}$$

Step S11: The value of the previous information $W_i$ and the value of the current information $W'_i$ are compared by a comparator 116. If they match, the information $W'_i$ will be accepted, but if they do not match, then no further processing will be executed. In this way, the bank 100 checks all of the K/2 i's, and if any one of them is rejected, then the subsequent processing will not be performed. When all the i's are found good, then the bank performs the following procedure to attach its blind signature to the remaining sets of information corresponding to $i = 1, \ldots, K/2$ which are not the objects to be opened.

Step S12: Based on the public key nA and secret key dA of the bank 100 and the blind signature information $W_i$ from the user 200, the following blind signature is obtained by a modulo multiplier 118 and an RSA signature generator 119:

$$W = \left( \prod_{i=1}^{K/2} W_i \right)^{dA} \bmod nA \tag{4}$$

Then, the bank 100 sends the blind signature W to the user 200.

Step S13: Upon receipt of the blind signature W from the bank 100, the user 200 calculates the license B from the random number $r_i$ and the public keys ea and nA by a modulo multiplier 216 and a modulo divider 217, using the intermediate term of the following equation:

$$B = W / \left( \prod_{i=1}^{K/2} r_i \right) \bmod nA = \left( \prod_{i=1}^{K/2} g(I_i \| N_i) \right)^{dA} \bmod nA \tag{5}$$

The intermediate term of Eq. (5) is equivalent to the left-hand side, and accordingly, the license B is equivalent to the user information I signed by the bank 100 using the secret key dA.

(2) Procedure for Issuing Electronic Cash

Figure 5:
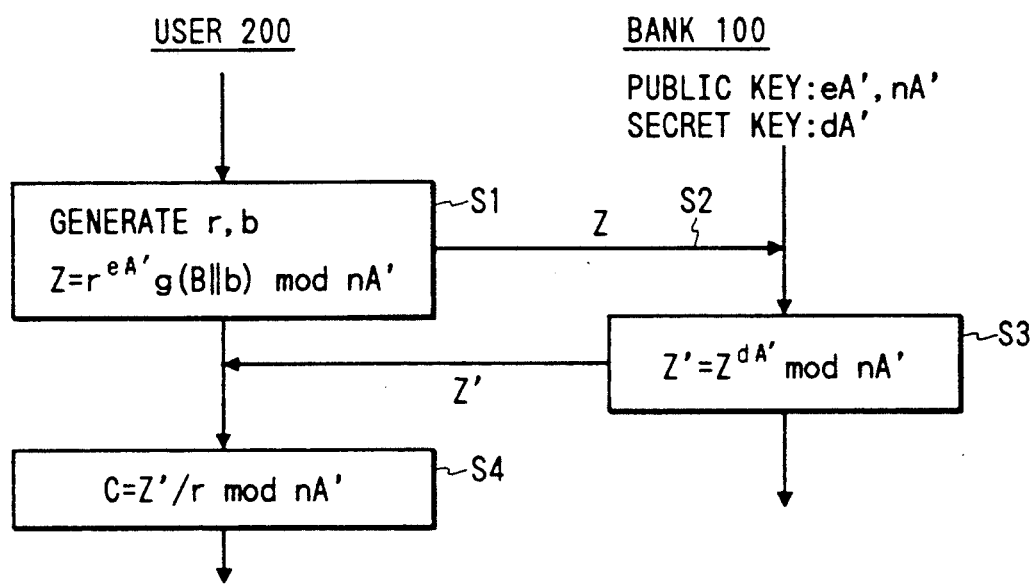
FIG. 5 is a block diagram illustrating an example of communication for the electronic cash issuance procedure.
Figure 6A:
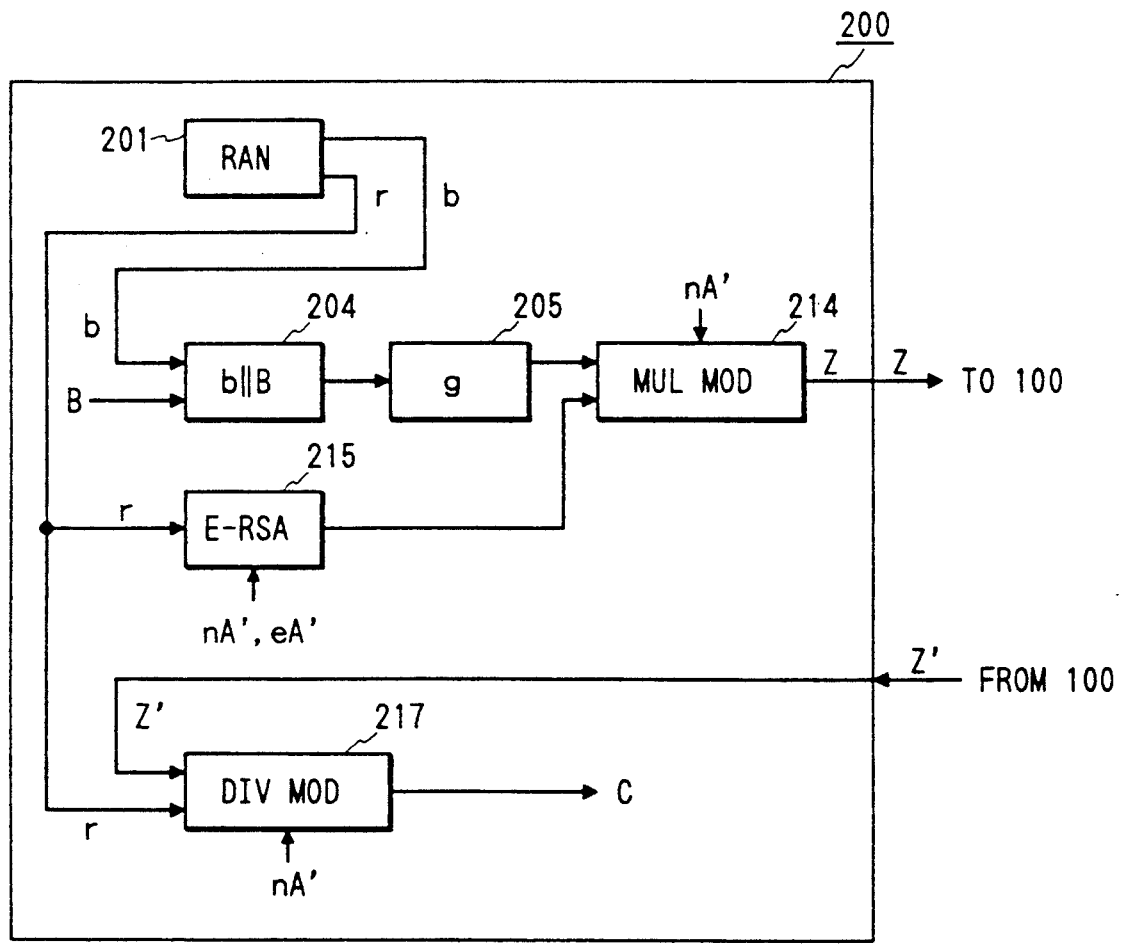
FIG. 6A is a block diagram illustrating the construction for the electronic cash issuance procedure on the part of the user.
Figure 6B:
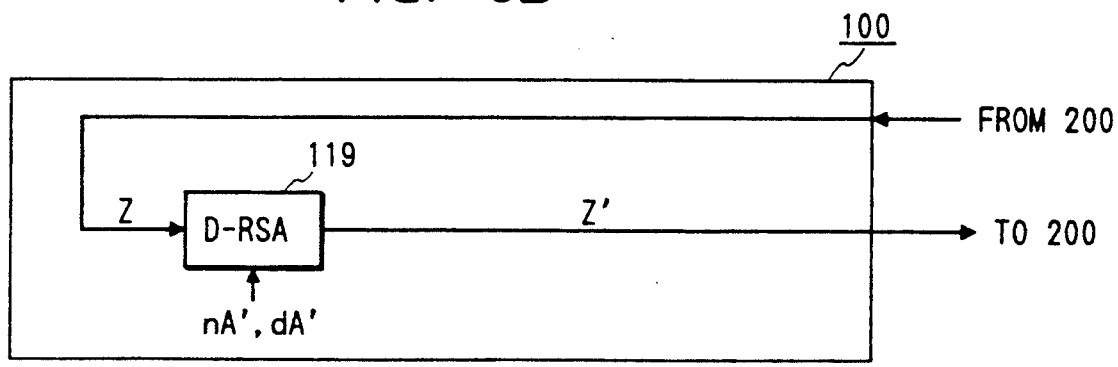
FIG. 6B is a block diagram illustrating the construction for the electronic cash issuance procedure.

Next, a description will be given of the procedure for the user 200 to get an electronic bill issued from the bank 100. At first, the bank 100 generates, as information corresponding to the face value of the electronic bill, pairs of the secret key dA' and the public keys eA' and nA' for RSA digital signature and opens the keys eA' and nA' together with the face value of the electronic bill. FIG. 5 shows an example of communication between the bank 100 and the user 200 in this instance. FIGS. 6A and 6B show arrangements for electronic bill issuance processing on the parts of the user 200 and the bank 100, respectively.

Step S1: The user 200 generates random numbers b and r by means of a random generator 201 and derives $g(B \| b)$ from the random number b and the license B by use for a concatenator 204 and a one-way hash function calculator 205. On the other hand, the random number r and the bank's public keys eA' and nA' corresponding to the face value of the electronic bill to be issued are supplied to an RSA encoder 215 to create authentication information $r^{eA'}$, and this information and the output, $g(B \| b)$, from the one-way hash function calculator 205 are provided to a modulo multiplier 214 to calculate $$Z = r^{eA'} g (B \| b) \bmod nA' \tag{6}$$

thereby obtaining blind signature information Z corresponding to the face value of the electronic bill to be issued.

Step S2: The blind signature information Z is sent to the bank 100 together with information about the face value of the electronic bill.

Step S3: Having received the information Z, the bank 100 supplies an RSA signature generator 119 with the information Z and the secret key dA' corresponding to the face value of the electronic bill to obtain $$Z' = Z^{dA'} \mod nA'.$$

That is, the bank 100 generates a blind signature Z' corresponding to the amount of money to be withdrawn from the user's account and then sends the blind signature Z' to the user 200. At the same time, the bank 100 withdraws the amount of money concerned from the user's account or receives the corresponding amount of money from the user 100.

Step S4: Having received the blind signature Z' from the bank 100, the user 200 inputs the random number r and the received information Z' and public key nA' into a modulo divider 217 to obtain the following bank's signature to the authentication information and the license:

$$C = Z'/r \mod nA' = (g(B \| b)^{dA'} \mod nA' \quad (7)$$

where C corresponds to the electronic bill.

The above-described electronic cash issuing procedure has the feature that the user 200 derives the blind signature information Z corresponding to a desired amount of money from the concatenation of the license B and the random number b instead of using such K/2 pieces of random information $R_i$ as are needed in the aforementioned Okamoto-Ohta system. Accordingly, the user 200 does not need to hold, as information on the electronic cash, such K/2 pieces of random information $R_i$, and the storage capacity for storing pieces of information B, C and $N_i$ on the electronic cash is small and hence is practical.

(3) Payment of Electronic Cash

A description will be given first of number-theoretic preparations necessary for explaining the division and use of electronic cash in the electronic cash system according to the present invention, and then of a money hierarchial structure on which the division and use of electronic cash are based.

Preparatory Number Theoretic Conventions

Definition: N is called the Blum integer if N=PQ (P, Q are prime) and P=3(mod 4), and Q=3(mod 4). N is called the Williams integer if N=PQ (P, Q are prime) and P=3(mod 8), and Q=7(mod 8). Note that the Williams integer is a specific type of the Blum integer and therefore has all properties of the Blum integer.

Let (x/N) denote the Jacobi symbol when N is a composite number, and denote the Legendre symbol when N is a prime. When N=PQ (P, Q are prime), $Z_N^*$ can be classified into four classes as follows:

$$\begin{aligned}
Z_{(1,1)} &= \{x \quad Z_N^* \mid (x/P) = 1, (x/Q) = 1\} \\
Z_{(1,-1)} &= \{x \quad Z_N^* \mid (x/P) = 1, (x/Q) = -1\} \\
Z_{(-1,1)} &= \{x \quad Z_N^* \mid (x/P) = -1, (x/Q) = 1\} \text{ and} \\
Z_{(-1,-1)} &= \{x \quad Z_N^* \mid (x/P) = -1, (x/Q) = -1\}
\end{aligned} \quad (8)$$

Clearly, $Z_{(1, 1)}$ denotes the set of quadratic residue integers in $Z_N^*$. Hereafter, $QR_N$ will often denote $Z_{(1, 1)}$, and $QNR_N$ as the other classes.

Proposition 1: Let N be the Blum integer, and $x \in QR_N$. Then, for any integer t ($1 \leq t$), there are four values $y_1, y_2, y_3, y_4$ such that $$(y_i)^{2^t} \equiv x (\mod N) \quad (9)$$

and that $y_1 \in Z_{(1,1)}, y_2 \in Z_{(1,-1)}, y_3 \in Z_{(-1,1)}, y_4 \in Z_{(-1,-1)}$. In addition, $$y_1 \equiv -y_4 (\mod N), \quad (10)$$

$$y_2 \equiv -y_3 (\mod N), \quad (11)$$

$$(y_1/N) = (y_4/N) = 1, \text{ and} \quad (12)$$

$$(y_2/N) = (y_3/N) = -1 \quad (13)$$

The above proposition immediately implies that four values of $2^t$-th root y of x can be uniquely determined by two bit information; one is whether (y/N)=1 or $-1$, and the other is whether y<N/2 or not. In other words, when y<N/2, there are two values of y, one of which is (y/N)=1 and the other is (y/N)=-1.

$x^{\frac{1}{2^t}} \mod N$ ($1 \leq t$) can be computed efficiently (in expected polynomial time) from x, P, Q, and (y/N) can also be computed efficiently from y and N, while to compute $x^{\frac{1}{2^t}} \mod N$ from x and N is as difficult as factoring N.

Proposition 2: Let N=PQ be the Williams integer. Then, for any $x \in Z_N^*$, either one of x, $-x$, 2x and $-2x$ is in $QR_N$. In addition, when $ax \in QR_N$ (a is either 1, $-1$, 2, or $-2$), bx is not is $QR_N$ (b$\neq$a, and b in either 1, $-1$, 2, or $-2$).

The above proposition 2 is easily proven by the following result: $(-1/P)=-1, (-1/Q)=-1, (2/P)=-1, (2/Q)=1$.

Definition: Let N be the Williams integer, and $x \in QR_N$.

$$[x^{\frac{1}{2^t}} \mod N]_{QR} = y \quad (14)$$

such that $y^{2^t} \equiv x (\mod N)$ and $y \in QR_N$, $$[x^{\frac{1}{2^t}} \mod N]_1 = y' \quad (15)$$

such that $(y')^{2^t} \equiv x (\mod N)$, (y'/N)=1 and $0 < y' < N/2$, and $$[x^{\frac{1}{2^t}} \mod N]_{-1} = y'' \quad (16)$$

Let N be the Williams integer, and $z \in Z_N$. such that $(y'')^{2^t} \equiv x (\mod N), (y''/N) = -1$ and $0 < y'' < N/2$, where $1 < t$, $$<Z>_{QR} = dz \mod N \quad (17)$$

such that $d \in \{\pm 1, \pm 2\}$ and $(dz \mod N) \in QR_N$, $$<Z>_1 = d'z \mod N \quad (18)$$

such that $d' \in \{1, 2\}$ and (d'z/N)=1, and $$<Z>_{-1} = d''z \mod N \quad (19)$$

such that $d'' \in \{1, 2\}$ and (d''z/N)=-1

From the properties of the Williams number (and the Blum number), each value of y, y', y", d, d', d" is uniquely determined, respectively.

Hierarchical Structure Table

In the present invention, the hierarchical structure table plays an important role because it allows the issued electronic bill C to be subdivided into many pieces such that each subdivided piece is worth any desired value less than C and the total value of all pieces is equivalent to C.

Figure 7A:
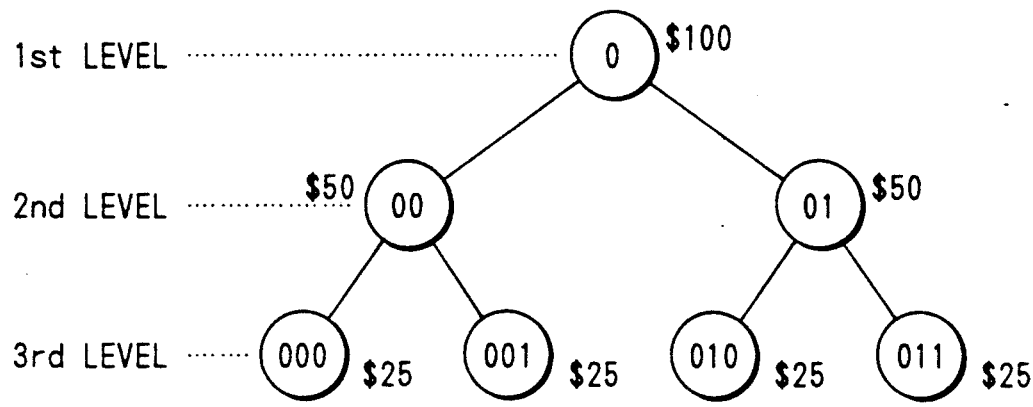
FIG. 7A is a hierarchial structure table of electronic cash.

The hierarchical structure table is a tree of t levels, in which each node has two sons and the unique root node exists at the top of the tree. So, there are $2^{m-1}$ nodes at the m-th level. Here, the significance of the tree in the cash system according to the present invention will be shown. For easy understanding, let it be assumed that the tree has three levels, and the value of the issued bill C is $100. The nodes of the m-th level correspond to $100/$2^{m-1}$. So, the customer can use the bill in $25 increments, since the nodes of the bottom level (the third level) correspond to $25 as shown in FIG. 7A.

The following are restrictions to the usage of the bill with respect to the tree:

(1) The value corresponding to any node must be the total of the values corresponding to nodes that are the direct sons of this node.

(2) When a node (the corresponding value) is used, all descendant nodes and all ancestor nodes of this node cannot be used.

(3) No node can be used more than once.

Here is shown the case where a customer uses $75 first and then uses $25. When the customer uses $75, he or she must use nodes 00 ($50) and 010 ($25). From the above restrictions, only a node 011 ($25) will be left which can be used after the use of the nodes 00 and 010 as can be seen from FIG. 7A.

More generally, if the customer wants to use a bill worth $1000 by the cent, he or she would need a hierarchical structure table of 17 levels ($\log_2 100{,}000 = 16.5$). The customer would then use about 8 nodes in average (minimum: one node; maximum: 16 nodes) in order to pay by the cent for each purchase (e.g., $334.36 payment).

Figure 7B:
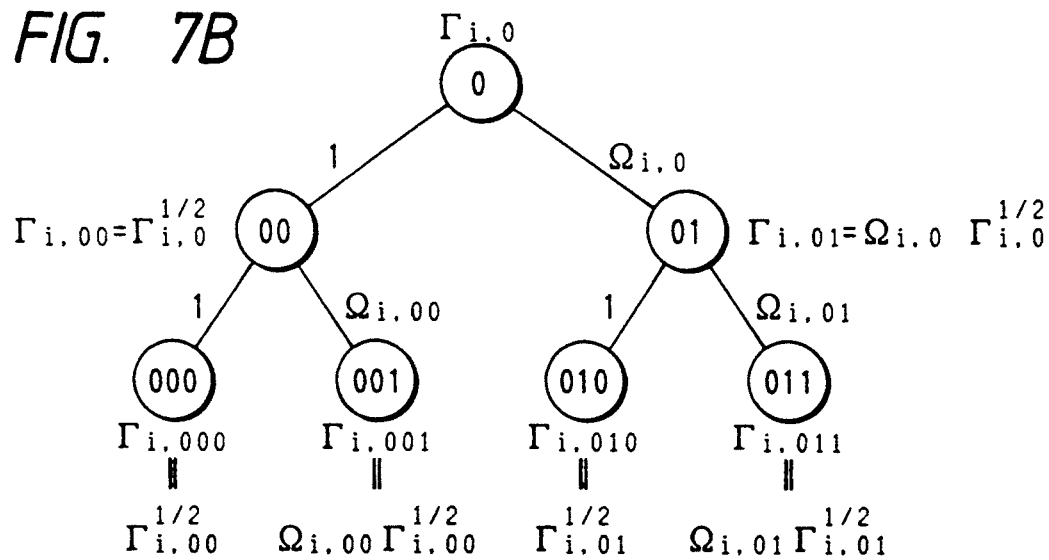
FIG. 7B is a diagram showing the structure of a Γ table corresponding to the table depicted in FIG. 7.

Moreover, in the embodiment of the cash scheme that will be shown hereinafter, two hierarchical structure tables ($\Gamma$ table and $\Lambda$ table) are used; the $\Gamma$ table is used to realize the above first restriction (1), and the $\Lambda$ table to realize the second restriction (2). The $\Gamma$ table and $\Lambda$ table have the same structure such that they are trees with the same topology (or the same number of layers) as shown in FIG. 7B, and that node values $\Gamma_{j_1...j_t}$ and $\Gamma_{j_1...j_t}$ both correspond to the same node position $j_1 .. . j_t$ in the money structure table. In the example of FIG. 7B, $\Gamma_{00}$ and $\Lambda_{00}$ correspond to the same position node 00, that is, the left node of $50, of the money structure table in FIG. 7A.

First, for easy understanding, a simple example of procedure will be shown, where the user 200 pays $75 to the shop 300 based on the hierarchical structure table of three levels. Here, let it be assumed that the user 200 has received a $100 bill C from the bank 100.

Step 1: As the preliminary procedure, the user 200 computes the value of $\Gamma_{i, 0}$ for each of $i=1, \ldots, K/2$ as follows:

$$\Gamma_{i, 0} = <f_\Gamma(C \| 0 \| N_i)>_{QR} \tag{20}$$

Step 2: When the user 200 decides to pay $75, first the user computes $X_{i, 00}$ corresponding to $50 and $X_{i, 010}$ corresponding to $25 for each of $i=1, \ldots, K/2$ as follows:

$$X_{i, 00} = [(\Gamma_{i, 0})^{\frac{1}{4}} \bmod N_i]_{-1} \tag{21}$$

$$X_{i, 010} = [(\Omega_{i, 0}\Gamma_{i, 0})^{\frac{1}{4}} \bmod N_i]_{-1} \tag{22}$$

where $$\Omega_{i, 0} = <f_\Omega(C \| 0 \| N_i)>_1 \tag{23}$$

The user sends $(I_i, N_i, X_{i, 00}, X_{i, 010})$ for all $i=1, \ldots, K/2$ and $(B, C)$ to the shop 300.

Note: The above calculation of $X_{i, 00}$ and $X_{i, 010}$ is based on the following algorithm:

$$X_{i, 00} = [(\Gamma_{i, 00})^{\frac{1}{2}} \bmod N_i]_{-1} \tag{24}$$

$$X_{i, 010} = [(\Gamma_{i, 010})^{\frac{1}{2}} \bmod N_i]_{-1} \tag{25}$$

where $$\Gamma_{i, 00} = [(\Gamma_{i, 0})^{\frac{1}{2}} \bmod N_i]_{QR} \tag{26}$$

$$\Gamma_{i, 00} = [(\Omega_{i, 0}\Gamma_{i, 0})^{\frac{1}{2}} \bmod N_i]_{QR} \tag{27}$$

$$\Gamma_{i, 010} = [(\Gamma_{i, 01})^{\frac{1}{2}} \bmod N_i]_{QR} \tag{28}$$

Here, summarizing the algorithm, first, the values $\Gamma_{i, 00}$ and $\Gamma_{i, 010}$ of $\Gamma_i$ table corresponding to the nodes i,00 and i,010 are calculated, then the square roots of these values in QNR (these Jacobi symbol values are $-1$) are defined as $X_{i, 00}$ and $X_{i, 010}$.

Step 3: The shop 300 verifies the validity of the signatures B for $(I_i, N_i)$, and C for B. The shop computes $\Omega_{i, 0}$ and $f_\Gamma(C \| 0 \| N_i)$, then verifies the validity of $X_{i, 00}$ and $X_{i, 010}$ for each of $i=1, \ldots, K/2$ such that $$(X_{i,00}/N_i) = (X_{i,010}/N_i) = -1 \tag{29}$$

$$X_{i,00}^4 \equiv d_i f_\Gamma(C \| 0 \| N_i)(\bmod N_i) \tag{30}$$

$$X_{i,010}^8 \equiv d_i \Omega_{i,0}^2 f_\Gamma(C \| 0 \| N_i)(\bmod N_i) \tag{31}$$

where $d_i \in \{\pm 1, \pm 2\}$ for $i=1, \ldots, K/2$. If they are valid, the shop 300 selects random bits, $E_{i, 00}, E_{i, 010} \in \{0, 1\}$ for $i=1, \ldots, K/2$, and sends them to the user 200. Otherwise, the shop halts this procedure.

Step 4: The user 200 computes $$Y_{i,00} = [(\Lambda_{i,00})^{\frac{1}{2}} \bmod N_i]_{(-1)^{E_{i,00}}} \tag{32}$$

$$Y_{i,010} = [(\Lambda_{i,010})^{\frac{1}{2}} \bmod N_i]_{(-1)^{E_{i,010}}} \tag{33}$$

and sends $(Y_{i, 00}, Y_{i, 010})(i=1, \ldots, K/2)$ to the shop 300. Here, $$\Lambda_{i, 00} = <f_\Lambda(C \| 00 \| N_i)>_{QR} \text{ and} \tag{34}$$

$$\Lambda_{i, 010} = <f_\Lambda(C \| 010 \| N_i)>_{QR}. \tag{35}$$

Step 5: The shop 300 verifies that $$(Y_{i,00}/N_i) = (-1)^{E_{i,00}} \tag{36}$$

$$(Y_{i,010}/N_i) = (-1)^{E_{i,010}} \tag{37}$$

$$Y_{i,00}^2 \equiv d'_i f_\Lambda(C \| 00 \| N_i)(\bmod N_i) \text{ and} \tag{38}$$

$$Y_{i,010}{}^2 = d''_i f_\Lambda(C \| 010 \| N_i) (\text{mod } N_i), \tag{39}$$

where $d'_i, d''_i \in \{\pm 1, \pm 2\}$ for $i = 1, \ldots, K/2$. If verification succeeds, the shop accepts the user's messages as \$75 from electronic bill C.

Procedure for Payment of Electronic Cash

Figure 9:
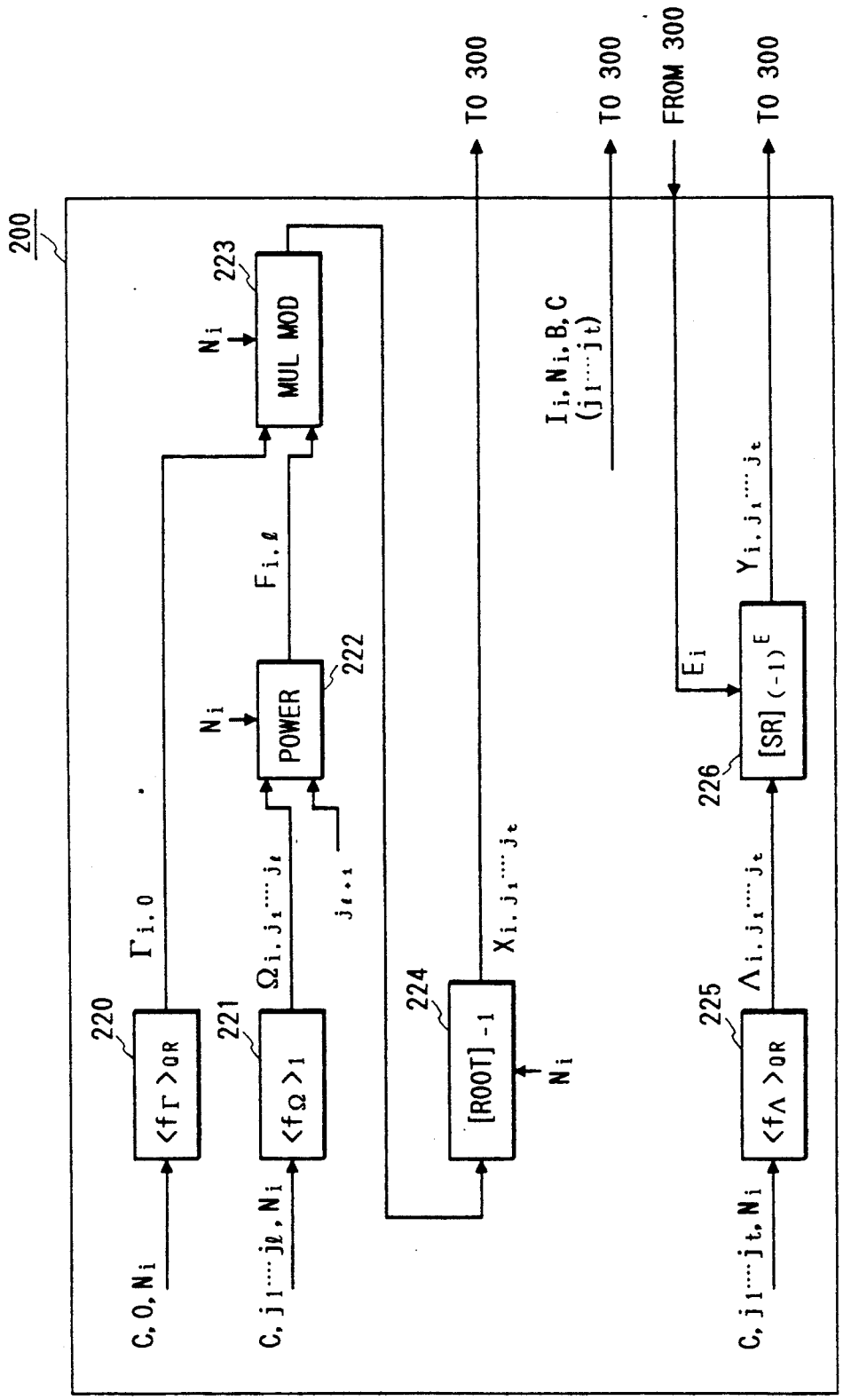
FIG. 9 is a block diagram illustrating the construction for the electronic cash using procedure on the part of the user.
Figure 10:
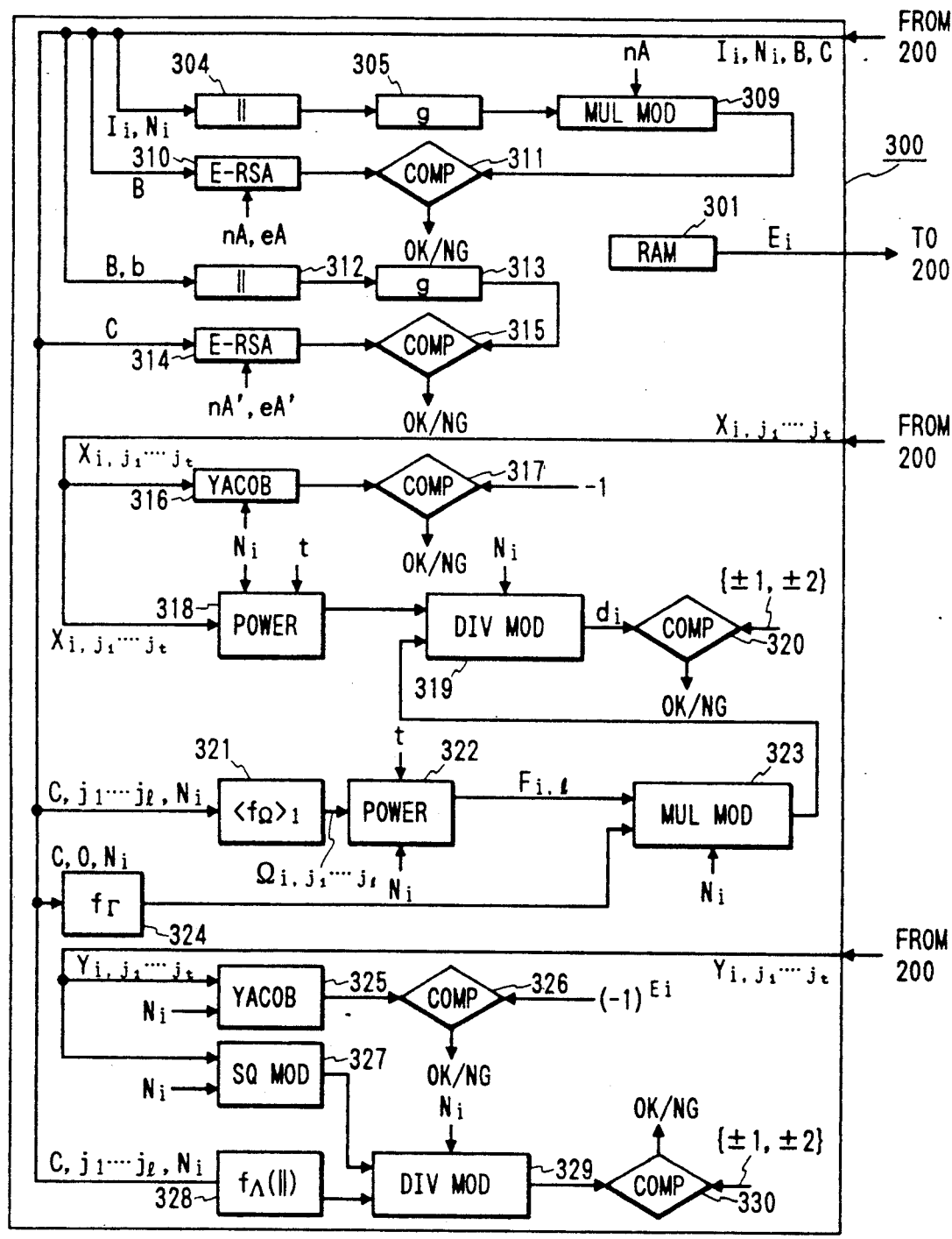
FIG. 10 is a block diagram illustrating the construction for the electronic cash using procedure on the part of the store.

Next, a concrete procedure between the user 200 and the shop 300 for the use of electronic cash, shown in FIG. 8, will be described with reference to FIGS. 9 and 10 which respectively show arrangements of the shop 300 and the user 200 for the procedure of the use of electronic cash. A description will be given later on of the cases where the user 1 (200) transfers electronic cash to the other user 2 (400) and where the latter pays with the transferred electronic cash at the shop 300. The following description will be made of the payment with the electronic bill issued from the bank 100.

Figure 7C:
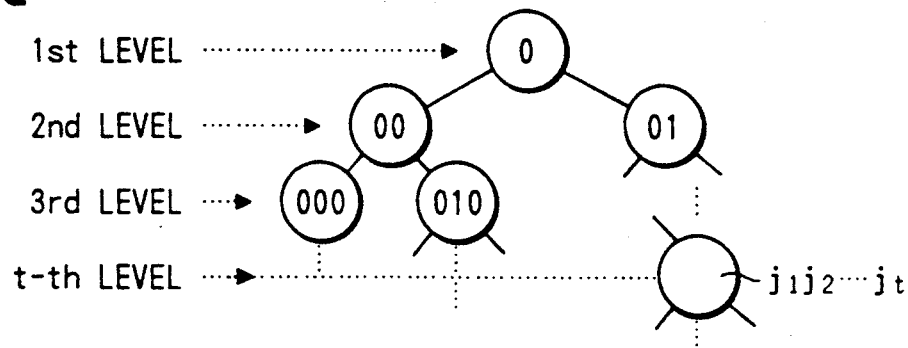
FIG. 7C is a diagram showing the general hierarchial structure of electronic cash.

The bank 100 establishes a money hierarchial structure (FIG. 7C), similar to that depicted in FIG. 7A, corresponding to the face value of the electronic cash C to be issued, defines the corresponding $\Gamma$ table and $\Lambda$ such as shown in FIG. 7B and further defines the random functions $f_\Gamma$, $f_\Lambda$ and $f_\Omega$. These pieces of information are all opened to the public. In many cases, a plurality of nodes of the hierarchial structure tables correspond to the amount of money to be used, but since the processing corresponding to the respective nodes is basically executed by the same algorithm and can be performed in parallel, the following description will be given of the processing for only one node. The position of the node concerned is expressed by $j_1 j_2, \ldots j_t (j_l \in \{0, 1\}, l = 1, \ldots, t)$, where t represents the level to which the node belongs (FIG. 7C). In the following, $i = 1, 2, \ldots, K/2$, accordingly the numbers of $\Gamma$ and $\Lambda$ tables used are $K/2$, respectively.

Step S1: at first, the user 200 obtains $\Gamma_{i,0}$ of the following equation from the pieces of information C and $N_i$ by use of a random function $\Gamma$ calculator 220:

$$\Gamma_{i,0} = <f_\Gamma(C \| 0 \| N_i)>_{QR} \tag{40}$$

Next, the information C, the nodes $j_1 \ldots j_t$ corresponding to the amount of money to be used and the information $N_i$ are provided to a random function $\Omega$ calculator 221, generating $\Omega_{i,j1\ldots jl}$ (where $l = 1, \ldots, t$) expressed by the following equation:

$$\Omega_{i,j1\ldots jl} = <f_\Omega(C \| j_1 \| \ldots \| j_l \| N_i)>_1 \tag{41}$$

Moreover, amount of money information $X_{i,j1\ldots jt}$, which is the residue power root of a value for the node corresponding to the amount of money to be used, is obtained, by the following equation (42), from $\Gamma_{i,0}$, $\Omega_{i,j1}\ldots jl$ (where $l = 1, \ldots, t$) and $N_i$ through use of a residue power calculator 222, a modulo multiplier 223 and a modulo power calculator 224. Here, $N_i$ is the Williams integer, which has already been generated by the multiplier 203 depicted in FIG. 3.

$$X_{i,j1\ldots jt} = \left[\left(\prod_{l=1}^{t-1} F_{i,l} \Gamma_{i,0}\right)^{\frac{1}{t}} \text{mod } N_i\right]_{-1} \tag{42}$$

Note: The above calculation of $X_{i,j1\ldots jt}$ is based on the following algorithm:

$$X_{i,j1\ldots jt} = [\Gamma_{i,j1\ldots jt}^{\frac{1}{t}} \text{mod } N_i]_{-1} \tag{43}$$

where $$\Gamma_{i,j1\ldots jt} = [\Omega_{i,j1\ldots jt}^{2jj+1} \Gamma_{i,j1\ldots jt}^{\frac{1}{t}} \text{mod } N_i]_{QR} \tag{44}$$

Step S2: The user 200 sends $(I_i, N_i, X_{i,j1\ldots jt})$ (where $i = 1, \ldots, K/2$), $(j_i, \ldots, j_t)$ and $(B, C)$ to the shop 300.

Step S3: The shop 300 verifies the validity of the signature to $(I_i \| N_i)$ of the license B on the basis of the public key $(eA, nA)$ by use of a concatenator 304, a one-way hash function calculator 305, a modulo multiplier 309, an RSA encoder 310 and a comparator 311, that is, a check is made to see if the following equation holds.

$$B^{eA} = \left(\prod_{i=1}^{K/2} g(I_i \| N_i)\right) (\text{mod } nA) \tag{45}$$

Moreover, the shop 300 verifies the validity of the signature to $(B \| b)$ of the electronic cash C on the basis of the public key $(eA', nA')$ by use of a concatenator 312, a one-way hash function calculator 313, a modulo multiplier 303, an RSA encoder 314 and a comparator 315, that is, a check is made to see if the following equation holds.

$$g(B \| b) = C^{eA'} \text{mod } nA' \tag{46}$$

If the validity of the signature is rejected, then the subsequent processing will not be performed.

Step S4: The shop 300 makes a check to see if the amount of money information $X_{i,j1\ldots jt}$ satisfies the following relationship, by use of a Jacobi symbol calculator 316 and a comparator 317. If not, then the subsequent processing will not be executed.

$$(X_{i,j1\ldots jt}/N_i) = -1 \tag{47}$$

Step S5: Next, the shop 300 derives $f_\Gamma(C \| O \| N_i)$ from C and $N_i$ by means of a random function $\Gamma$ calculator 324. Besides, the shop 300 inputs C, $j_1 \ldots j_t$ and $N_i$ into a random function $\Omega$ calculator 321 to generate $\Omega_{i,j1}\ldots jl$ (where $l = 1, \ldots, t$) by the following equation:

$$\Omega_{i,j1\ldots jl} = <f_\Omega(C \| j_1 \| \ldots \| j_l \| N_i)>_1 \tag{48}$$

Further, the shop 300 obtains the following equation by means of a modulo power calculator 322:

$$F_{i,l} = \Omega_{i,j1\ldots jl}^{2l/j+1} \text{mod } N_i, l = 1, \ldots, t-1$$

Then the shop 300 calculates the following equation through utilization of the outputs of the modulo power calculator 322 and the random function $\Gamma$ calculator 324.

$$f_\Gamma(C \| O \| N_i), \Omega_{i,j1}\ldots jl (l = 1, \ldots, t)$$

Step S6: The shop 300 uses the outputs of a modulo power calculator 318 and a modulo multiplier 323 to obtain, by means of a modulo divider 319, $d_i$ which satisfies the following equation:

$$X^{2^t}_{i,j_1\ldots j_t} = d_i \prod_{l=1}^{t-1} F_{i,l} f_{\Gamma}(C \parallel 0 \parallel N_i)(\bmod N_i) \quad (49)$$

and verifies the validity of the amount of money information $X_{i,j_1\ldots j_t}$ by checking whether $d_i$ matches $\pm 1$ and $\pm 2$ by means of a comparator 320, where $i=1,\ldots, K/2$.

Step S7: The shop 300 sends random bits $E_{i,j_1\ldots j_t} \in \{0, 1\}$ ($i=1,\ldots, K/2$) derived from a random generator 301, as inquiry information, to the user 200.

Step S8: The user 200 calculates the following equation from C, $j_1 \ldots j_t$ and $N_i$ by means of a random function $\Lambda$ calculator 225.

$$\Lambda_{i,j_1\ldots j_t} = <f_\Lambda(C\|j_1\| \ldots \|j_t\| N_i)>_{QR} \quad (50)$$

Next, response information of the following equation is calculated from $\Lambda_{i,j_1\ldots j_t}$ and $E_{i,j_1\ldots j_t}$ by use of a modulo square root calculator 226.

$$Y_{i,j_1\ldots j_t} = [(\Lambda_{i,j_1\ldots j_t})^{\frac{1}{2}} \bmod N_i](-1)^{E_{i,j_1\ldots j_t}} \quad (51)$$

The user 200 sends the response information $Y_{i,j_1\ldots j_t}$ to the shop 300.

Step S9: The shop 300 makes a check to see if the response information $Y_{i,j_1\ldots j_t}$ satisfies the relationship of the following equation, by use of a Jacobi symbol calculator 325 and a comparator 326. If not, the subsequent processing will not be executed.

$$(Y_{i,j_1\ldots j_t}/N_i) = (-1)^{E_{i,j_1\ldots j_t}} \quad (52)$$

Next, the shop 300 inputs C, $j_1 \ldots j_t$ and $N_i$ into a random function $\Lambda$ calculator 328 to obtain $$f_\Lambda(C\|j_1\| \ldots \|j_t\| N_i)$$

and, at the same time, calculates the following equation $$Y_{i,j_1\ldots j_t} \bmod N_i$$

by use of a modulo power calculator 327. The outputs are applied to a modulo divider 329 to obtain $d'_i$ which satisfies the following equation:

$$Y_{i,j_1\ldots j_t}^2 \equiv d'_i f_\Lambda(C\|j_1\| \ldots \|j_t\| N_i)(\bmod N_i) \quad (53)$$

Further, the shop 300 checks $d'_i$ by a comparator 330 as to which of $\pm 1$ and $\pm 2$ it matches. If it matches either one of them, then the shop 300 will regard the payment of the amount of money corresponding to the node $j_1 \ldots j_t$ of the electronic bill as valid and receive it.

Figure 8:
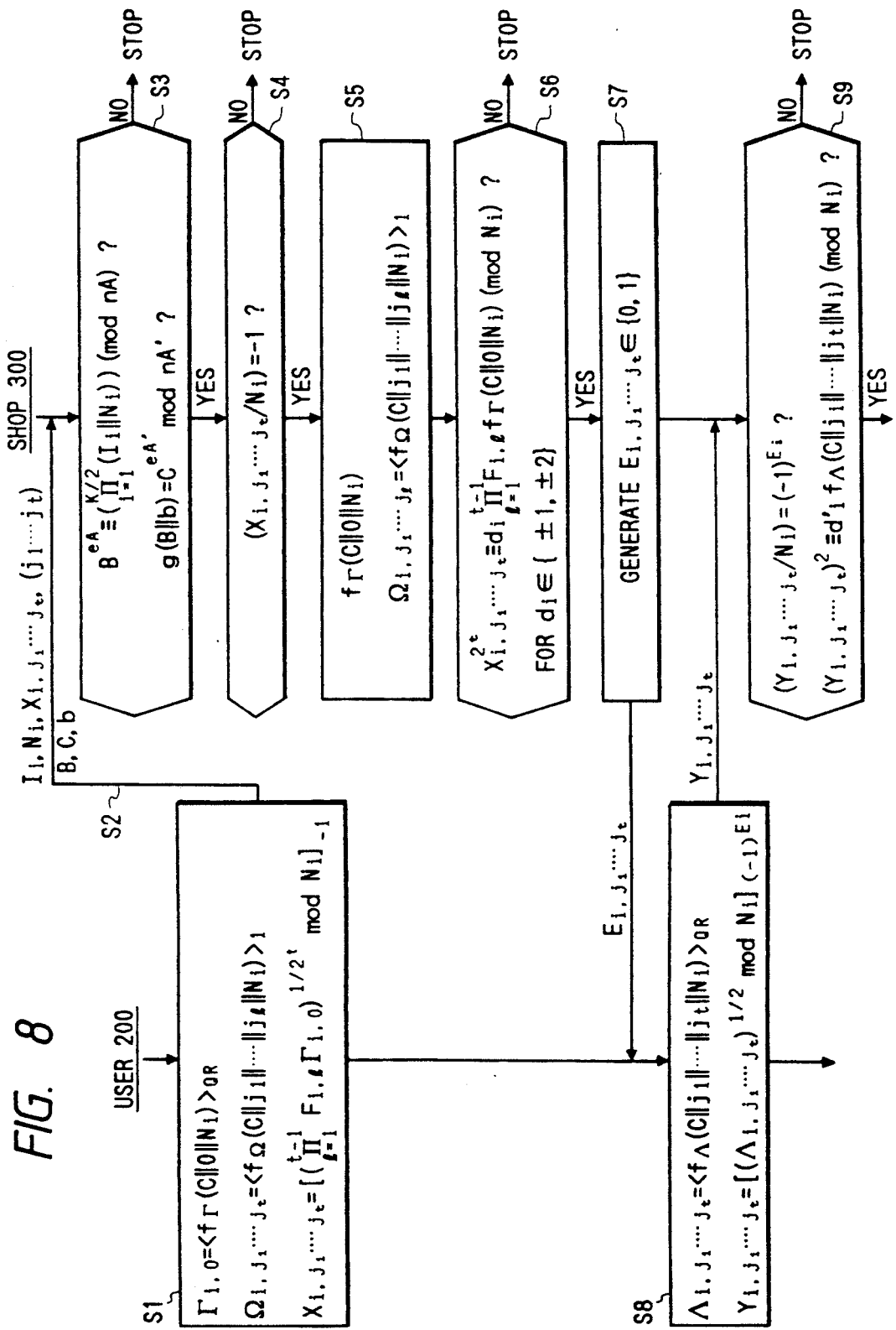
FIG. 8 is a diagram showing an example of communication in the procedure for using electronic cash.

In the above example the electronic cash is subdivided into a plurality of pieces each worth a desired value, but in the case of using the full face value of the electronic cash by one payment, the user 200 does not conduct step S1 in FIG. 8 but instead transmits the pieces of information $I_i$, $N_i$, B and C to the shop 300 in step S2. The shop 300 makes the check in step S3 and if the license B and the electronic cash C are found valid, then the shop 300 receives them and does not perform the subsequent steps S4 through S6, immediately generates the inquiry information $E_i$ in step S7, and sends it to the user 200. The user 200 produces, in step S8, response information $Y_i$ by, for example, Eqs. (50) and (51) with $j_i \ldots j_t$ removed therefrom and provides it to the shop 300. The shop 300 performs the verification in step S9 by use of Eqs. (52) and (53) with $j_i \ldots j_t$ removed therefrom. In the case of using the electronic cash without subdividing it into pieces as mentioned above, the transmission of information in step S2 may be done at the same time as the response information $Y_i$ is transmitted in step S8.

It must be noted here again that since the amount of money information $X_i$ is calculated through use of the random function $f_\Omega$ and the $\Gamma$ table in step S1, it is only the license B, the electronic cash C, the random number b, the user information $I_i$ and the composite number $N_i$ that the user 200 has to hold for showing to the shop 300 in step S2. In contrast thereto, it is necessary in the aforementioned Okamoto-Ohta system that the user hold not only these pieces of information but also k/2 pieces of secret information $X_i$ generated from k/2 random numbers when the electronic cash was issued. Moreover, when calculating the response $Y_i$ of Eq. (51) in step S8, the user 200 obtains the modulus power root of the random function $f_\Lambda$ through calculation; namely, k/2 random numbers $R_i$ used for the issuance of electronic cash in the prior Okamoto-Ohta system are not used for the generation of the response $Y_i$, hence the amount of information which is held together with the electronic cash is extremely small. That is, the present invention permits the verification by calculating the modulo power roots of certain functions, such as expressed by Eqs. (43), (44) and (51) and providing them to the shop, whereas the prior Okamoto-Ohta system produces a verifiable response through use of the random numbers $R_i$ used at the time of issuing the electronic cash.

(4) Transfer of Electronic Cash

At first, a hierarchial structure table is established corresponding to the face value of the electronic bill and its minimum unit of use, and the positions of nodes in the table are determined corresponding to the amount of money to be transferred.

Next, a description will be given of the case where the user 1 transfers electronic cash to the user 2.

Figure 11:
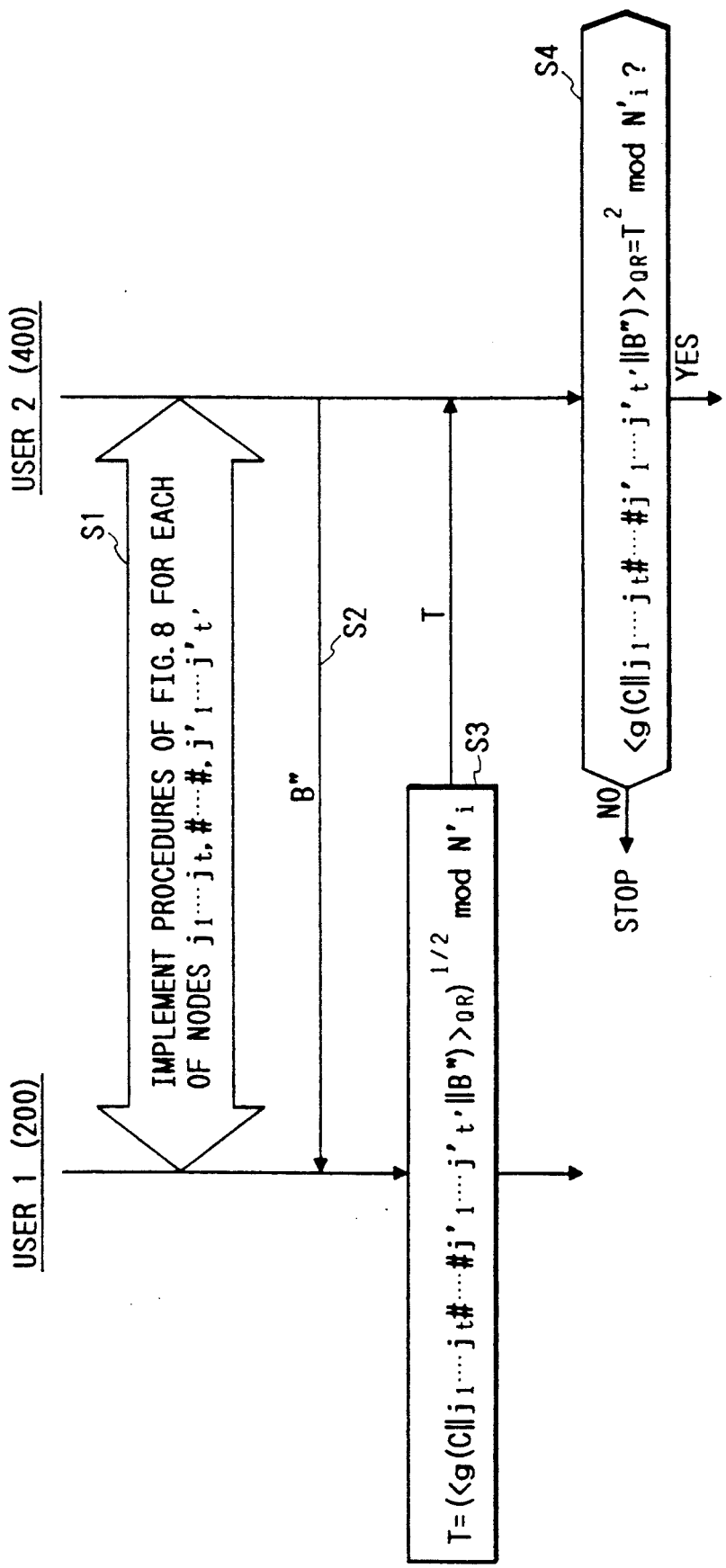
FIG. 11 is a diagram showing an example of communication in the case of transferring electronic cash.

FIG. 11 shows an example of communication between the users 1 and 2. In the following, variables with one prime "'" are related to user 1 and variables with two primes "''" are related to user 2. The variables have the same meanings as defined previously, unless otherwise specified.

Step S1: The nodes corresponding to the amount of money to be transferred are made nodes $j_1 j_2 \ldots j_t$ (where $j_i \in \{0, 1\}$) (FIG. 7B). The user 1 (200) performs, as the user 1 in FIG. 8, a procedure similar to that for the payment of electronic cash to the shop 200 and the user 2 (400) executes, as the shop 300 in FIG. 8, a procedure similar to that for receiving from the user 1 (200) electronic cash corresponding to the nodes $j_1 j_2 \ldots j_t$. In many cases, a plurality of nodes of the hierarchial structure table correspond to the amount of money to be transferred, but as described previously with reference to FIG. 8, the processing corresponding to each node is executed by basically the same algorithm and the procedures of the respective nodes can be executed in parallel.

Step S2: When the user 2 (400) has found, by the communication in step S1, that the license B, the electronic cash C, the amount of money information $X_{i,j_1\ldots j_t}$ and the response information $Y_{i,j_1\ldots j_t}$ of the user 1 are valid, the user 2 (400) shows his license B'' to the user 1.

Step S3: The user 1 (200) creates the following deed of transfer T through utilization of the license B" of the user 2 (400) and offers it to the user 2.

$$T = \{<g(C\|j_1\ldots j_t\#\ldots \#j'_1\ldots j'_{t'}\|B'')>_{QR}\}^{\frac{1}{2}} \mod N'_i \quad (54)$$

where $j_1\ldots j_t\#\ldots \#j'_1\ldots j'_{t'}$ represents all the nodes corresponding to the amount of money to be transferred.

Step S4: After verifying the validity of the deed of transfer T by making a check to see if the following equation (55) holds, the user 2 (400) holds the history H' of the above procedure (steps S1 and S3) as transferred electronic cash.

$$<g(C\|j_1\ldots j_t\#\ldots \#j'_1\ldots j'_{t'}\|B''>_{QR} = T^2 \mod N'_i \quad (55)$$

(5) Payment with Transferred Electronic Cash

Next, a description will be given of the procedure by which the user 2 (400) pays with the transferred electronic cash at the shop (300).

At first, a hierarchial structure table is established corresponding to the face value of the electronic cash and its minimum unit of use as mentioned previously, and that one of the nodes corresponding to the transferred electronic cash which is used to effect payment is determined.

Figure 12:
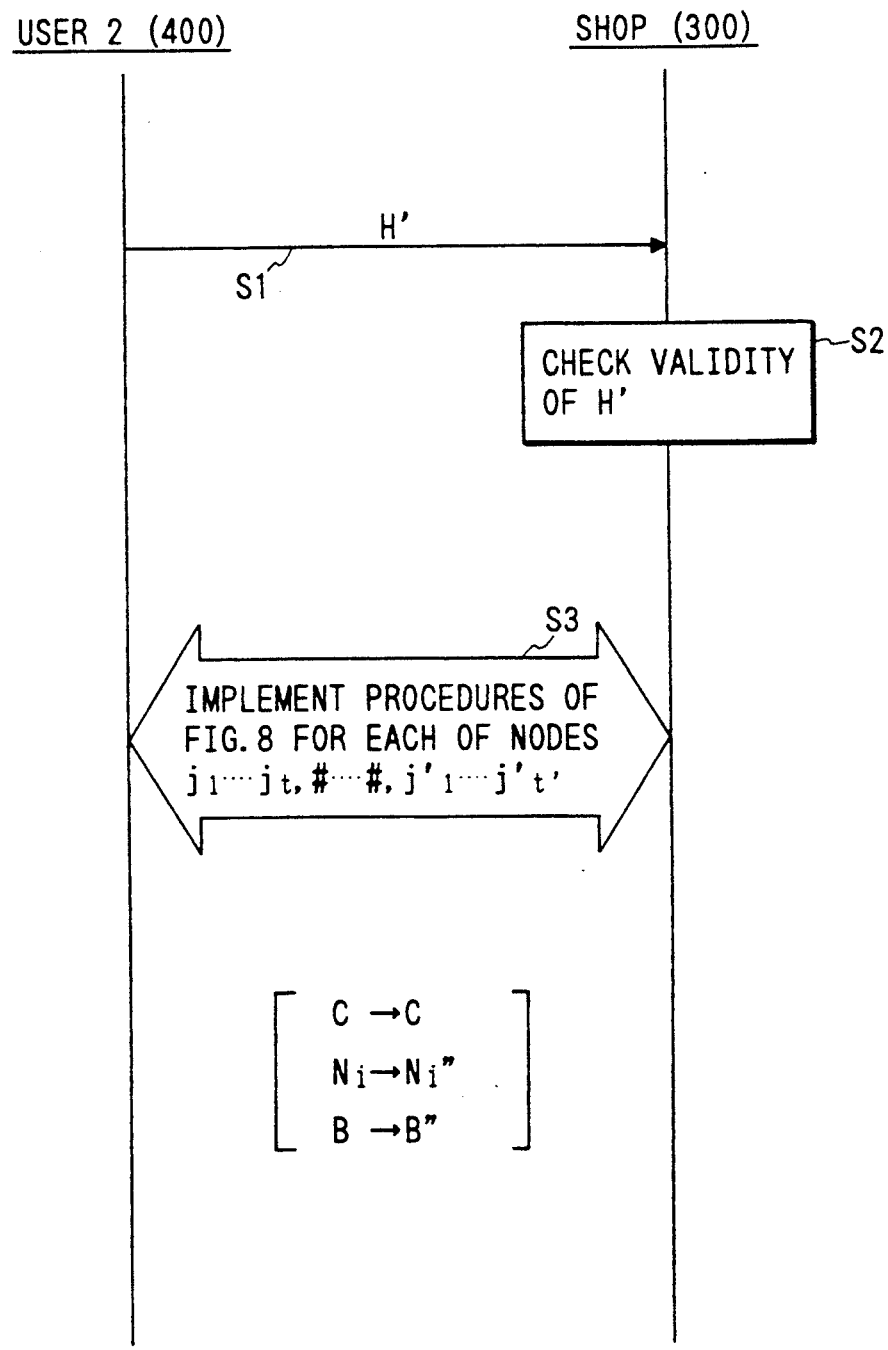
FIG. 12 is a diagram showing an example of communication in the case of payment by transferred electronic cash.

FIG. 12 shows an example of communication between the user 2 (400) and the shop (300).

Step S1: The user 2 (400) first transfers electronic cash H' to the shop (300). Further, the user 2 (400) informs the shop (300) of the amount paid and the corresponding node.

Step S2: The shop (300) verifies the validity of the electronic cash H' and checks if the node corresponding to the payment is included in the nodes corresponding to the transferred electronic cash. If they are not found good, the processing is stopped.

Step S3: The user 2 (400) and the shop 300 follow the procedure of the user 1 in FIG. 8 and the procedure of the shop 300 in FIG. 8 to perform the procedure of payment of the node concerned. In the execution of the procedures depicted in FIG. 8, the transferred cash C is used as the electronic cash C and the pieces of information $N''_i$ and B" of the user 200 (400) are used as $N_i$ and B.

(6) Settlement of Accounts

Next, a description will be given of a method of settlement of accounts between the shop 300 and the bank 100. The shop 300 offers to the bank 100 a history H (or H') of the communication with the user (200) or (400) for the transaction therebetween and demands the bank 100 to pay the amount of money concerned. The bank 100 checks whether the same electronic cash C as that in the information H offered thereto has been already recorded on an information memory, and if not, the bank 100 verifies the validity of the information H (or H'). If the information is found good, then the bank 100 will store it in the information memory and pay the charged amount of money into the shop's account. In the case where the same electronic cash is found in the records stored in the information memory, the bank 100 uses the pieces of information offered thereto together with the electronic chases to check if the aforementioned two restrictions (a) and (b) concerning the use of the node are satisfied or not, and if satisfied, then the bank 100 will pay the charged amount of money into the shop's account and store the information H in the information memory. When either one of the two restrictions are not satisfied, the composite number $N_i$ is factorized into prime numbers to obtain the secret information $S_i$ of the abuser and determines his identification information $ID_p$.

Security

First, it will be shown that a third restriction of the hierarchial structure table is securely realized. If user 200 uses any part of electronic cash C (any node of the hierarchial structure table of C) more than once, the bank 100 can obtain the identity $ID_p$ of the user 200 with overwhelming probability, since the Williams integer N can be factored in polynominal-time from $[x^{\frac{1}{2}} \mod N]_1$ and $[x^{\frac{1}{2}} \mod N]_{-1}$, and since the shop 300 challenges the user 200 randomly using the $\Lambda$ table, along with the cut-and-choose methodology. That is, in the case where the user 200 has used the same node at two shops in FIG. 8, the probability that inquiry random bits $E_i$ produced by the two shops match in all i's is very low. For at least one i the one shop generates $E_i = 1$ and the other shop generates $E_i = 0$. Then, the response $Y_i$ that the user 200 produces for each shop in step S8 contains, for the same i, the above-noted $Y_i = [x^{\frac{1}{2}} \mod N]_{-1}$ and $Y_1 = [x^{\frac{1}{2}} \mod N]_1$. Thus, the bank 100 can ultimately obtain the pieces of information $P_i$ and $Q_i$ by easy factorization of the composite number $N_i$ into prime factors on the basis of these two different pieces of information $Y_i$ contained in the information related to the same electronic cash C collected from the two shops. As a result, the secret information $S_i$ can be obtained using the user information $I_i$, hence the identification information $ID_p$ contained in the information $S_i$ can be known. For the same reason, when the electronic cash is used twice in the embodiment wherein the electronic cash is not subdivided, the secret information $S_i$ of the abuser is obtained and his identification information $ID_p$ is revealed.

Next, it will be shown that the second restriction of the hierarchial structure table is securely realized. Here, to facilitate understanding, a simple example will be given, where the value of C is $100, and the user 200 pays $75 to the shop 300 (see FIG. 7B). Note that the cut-and-choose methodology is also implicitly crucial in assuring correctness, although detailed explanation is omitted here (roughly, according to this methodology, it is possible to assume that $I_i$, $N_i$ are correctly generated).

The first restriction is satisfied as follows: When nodes 00 and 010 are used, then all descendant and ancestor nodes of these nodes, 0, 00, 001 and 01 cannot be used. When node 00 is used, the user 200 sends the following value information $$X_{i,00} = [(\Gamma_{i,00})^{\frac{1}{2}} \mod N_i]_{-1} \ (i=1,\ldots, K/2)$$

to the shop 300 (and finally to the bank 100). Then, if the customer 200 uses node 000, the user 200 sends the following value information $$X_{i,000} = [(\Gamma_{i,000})^{\frac{1}{2}} \mod N_i]_{-1} \ (i=1,\ldots, K/2).$$

Since it holds that $$[(\Gamma_{i,00})^{\frac{1}{2}} \mod N_i]_1 = (X_{i,000})^2 \mod N_i,$$

the bank 100 can factor $N_i$ from $X_{i,00}$ and $(X_{i,000})^2$ mod $N_i$, then the identity $ID_p$ of the user 200 is revealed. Similarly, if node 0 or 001 is used with node 00, or if node 0 or 01 is used with node 010, then the identity $ID_p$ of the user is revealed. Therefore, when nodes 00 and 010 are used, then nodes 0, 000 and 01 cannot be used, with concealing the identity $ID_p$ of the user 200.

Finally, the necessity of random variable $\Omega$ will be shown using a simple example as follows: Assume that $\Omega_{i,j1\ldots ji}$ is a constant value, e.g., 3. Then, in FIG. 7B, $\Gamma_{01}=3(\Gamma_0)^{\frac{1}{2}}$, where the suffix of i and mod $N_i$ are omitted for simplicity. So, when a customer uses the nodes 00 and 01, he opens the following values $$X_{00}=(\Gamma_0)^{\frac{1}{4}} \text{ and } X_{01}=\{3(\Gamma_0)^{\frac{1}{2}}\}^{\frac{1}{4}}=3^{\frac{1}{4}}(\Gamma_0)^{\frac{1}{8}},$$

where the jacobi symbol values of $X_{00}$ and $X_{01}$ are $-1$. Then, the shop 300 can obtain $3^{\frac{1}{4}}$ by calculating $X_{01}/X_{00}$, where the Jacobi symbol of this value is 1. The same situation occurs when the customer uses the nodes 000 and 001, and so on. Therefore, suppose that a customer uses nodes 000, 001 and 0110, whose usage is valid, which means he opens $X_{000}$, $X_{001}$, $X_{010}$ and $X_{0110}$. Then, the shop 300 can calculate $V=3^{\frac{1}{4}}$ by $X_{001}/X_{000}$, and also calculate the value of $X_{011}$ by $VX_{010}$. Therefore, the shop can factor N by using the values of $X_{011}$ and $(X_{0110})^2$, where the Jacobi symbol of $X_{011}$ is $-1$ and that of $(X_{0110})^2$ is 1. Thus, the shop can know the customer's ID, although the customer uses the nodes validly.

As described above, the present invention has the feature that the amount of information related to electronic cash, which the user has to hold, is smaller than in the aforementioned Okamoto-Ohta system. Moreover, according to the present invention, electronic cash once issued can be subdivided into many pieces each worth a desired value until the total value of all the pieces become equal to the face value of the electronic cash determined when it was issued.

What is claimed is:

1. An electronic cash system wherein a user who possesses electronic cash and a license issued from a bank uses said electronic cash, including:
   Step 1 wherein said user furnishes a shop with information containing a composite number, said electronic cash and said license, said composite number being the product of at least two prime numbers;
   Step 2 wherein said shop verifies the validity of said license and said electronic cash and, if they are valid, creates and offers inquiry information to said user;
   Step 3 wherein said user calculates, following said inquiry information, a residue power root of a function using said composite number as a modulo and provides it as response information to said shop; and
   Step 4 wherein said shop uses said composite number to verify the validity of said response information.

2. An electronic cash system wherein a user uses a license and electronic cash issued from a bank, including:
   Step 1 wherein said bank establishes a hierarchial structure table which is a tree having a plurality of levels and in which one node corresponding to the face value of said electronic cash issued to said user is set to the highest level and nodes of lower levels are sequentially branched from said node of the highest level in a tree form, and a unit value is made to correspond to each node so that the unit value corresponding to a desired node is equal to the total sum of the unit values of immediately descendant nodes branched therefrom;
   Step 2 wherein said user selects a combination of nodes corresponding to the amount of money used from said hierarchial structure table in accordance with the following restrictions:
   (a) Once a node is used, all of its ancestor and descendant nodes should not be used thereafter; and
   (b) Each node should not be used more than once; and
   Step 3 wherein said user creates amount of money information corresponding to each of said selected nodes and offers it to said shop together with said electronic cash and said license.

3. The electronic cash system of claim 2 wherein: in the case of paying with said electronic cash at said shop, said user provides residue power roots corresponding to said selected nodes, as said amount of money information to said shop in said step 3; said shop verifies the validity of said license and said electronic cash and, if they are valid, provides inquiry information to said user; said user generates response information corresponding to said inquiry information from said shop by obtaining residue power roots of values corresponding to said nodes in said hierarchial structure table and then provides said response information to said shop; and said shop verifies the validity of said response information from said user and, if it is valid, allows the payment with said electronic cash of said amount of money used.

4. The electronic cash system of claim 1 wherein said composite number is the Williams integer.

5. The electronic cash system of claim 1 or 2 wherein when said user opens an account with said bank, said user performs:
   step S1 wherein said user produces K sets of first blind signature information by blind processing of secret information containing identification information of said user by a random number, K being an integer equal to or greater than 2;
   step S2 wherein said bank makes said user open L sets of said blind signature information and, if said opened pieces of information are correct, attaches a blind signature to the remaining unopened K-L sets of said first blind signature information and transmits them to said user, L being greater than 2 but smaller than K;
   step S3 wherein said user calculates the signature of said bank to said user information from said blind signature received from said bank, thereby obtaining said signed user information as said licence; and
   wherein when said user withdraws electronic cash of a certain face value from said bank, said user performs:
   step S4 wherein said user produces authentication information containing said license and generates second blind signature information by blind processing of said authentication information by a public key corresponding to the face value of said electronic cash to be withdrawn and transmits said second blind signature information to said bank;
   step S5 wherein said bank attaches a blind signature to said second blind signature information, using a secret key corresponding to the amount of money to be withdrawn and transmits said signed second blind signature information to said user; and step S6 wherein said user calculates the signature of said bank to said authentication information from said blind signature received from said bank and uses said signed authentication information as said electronic cash.

6. The electronic cash system of claim 1 or 3 wherein said shop transmits all communications between said user and said shop to said bank to settle an account, said bank verifies the validity of said communications and, if they are valid, stores them in a memory and when the same electronic cash is used fraudulently, said bank calculates secret information of said user used for the generation of said license.

7. The electronic cash system of claim 2 wherein when said user, who is a first user, transfers said electronic cash to a second user with a license in said step 3, said first user defines a node corresponding to the amount of money of said electronic cash to be transferred in said hierarchial structure table and provides to said second user said electronic cash and a residue power root of the value corresponding to said node corresponding to said amount of money to be transferred; said second user verifies the validity of said electronic cash and provides inquiry information to said first user; said first user generates response information corresponding to said inquiry information from said second user by obtaining a residue power root of the value corresponding to said node in said hierarchial structure table and offers said response information to said second user; said second user verifies the validity of said response information from said first user and, if it is valid, shows said license of his own to said first user; said first user generates, as a deed of transfer, a residue power root corresponding to information containing the node position representing said amount of money to be transferred, said electronic cash and said license of said second user and provides said deed of transfer to said second user; and said second user verifies the validity of said deed of transfer and acknowledge the transfer of said electronic cash of said amount of money.

8. The electronic cash system of claim 7 wherein when said second user uses said transferred electronic cash at a shop, said second user determines the amount of money to be used, within said transferred amount of money, determines a node corresponding to said amount of money to be used in said hierarchial structure table corresponding to said transferred electronic cash, offers said electronic cash and said deed of transfer to said shop together with a residue power root of the value corresponding to said node; said shop verifies the validity of said electronic cash and said deed of transfer and provides inquiry information to said second user; said second user generates response information corresponding to said inquiry information from said shop by obtaining a residue power root of the value corresponding to said node in said hierarchial structure table and offers said response information to said shop; and said shop verifies the validity of said response information from said second user and, if it is valid, acknowledge the payment with said electronic cash of said amount of money to be used.

9. The electronic cash system of claim 8 wherein when said shop provides all communications between said second user and said shop to said bank to settle an account; and said bank verifies the validity of said communications and, if they are valid, stores them in a memory and if said electronic cash is used fraudulently, said bank obtains the identification information of said user by calculating secret information of said user used for the generation of a license.

10. The electronic cash system of claim 6 wherein said bank makes a check to see if the same electronic cash as that in information received from said shop has already been stored in said memory, and if so, checks whether said two pieces of response information attached to said two pieces of electronic cash have portions which do not match, and if so, said bank factorizes a number corresponding to said portion to prime numbers to obtain the identification number of said user.

11. The electronic cash system of claim 3 wherein said shop transmits all communications between said user and said shop to said bank to settle an account; said bank makes a check to see if the same electronic cash as in information received from said shop has already been stored in said memory, and if so, checks whether at least two nodes used for said two pieces of electronic cash satisfy said restrictions or not, and if not, said bank factorizes numbers corresponding to said two nodes into prime factors to obtain the identification number of said user.

* * * * *